US012632291B2

(12) United States Patent
Xu et al.

(10) Patent No.: US 12,632,291 B2
(45) Date of Patent: May 19, 2026

(54) CONTROLLING JOB PACKING PROCESSING UNIT CORES FOR GPU SHARING

(71) Applicant: International Business Machines Corporation, Armonk, NY (US)

(72) Inventors: Qing Xu, Beijing (CN); Shuai Zhang, Shaanxi (CN); Ze Ming Zhao, Beijing (CN); Guang Han Sui, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 665 days.

(21) Appl. No.: 17/649,162

(22) Filed: Jan. 27, 2022

(65) Prior Publication Data

US 2023/0236879 A1     Jul. 27, 2023

(51) Int. Cl.
*G06F 9/48*          (2006.01)
(52) U.S. Cl.
CPC ................................... *G06F 9/4881* (2013.01)
(58) Field of Classification Search
CPC ...................................................... G06F 9/4881
See application file for complete search history.

(56) References Cited

U.S. PATENT DOCUMENTS

| | | | |
|---|---|---|---|
| 11,797,280 B1 * | 10/2023 | Kannan | .................... G06F 8/451 |
| | | | 718/104 |
| 2002/0016785 A1 * | 2/2002 | Sirgany | ................. G06F 9/4881 |
| | | | 706/46 |
| 2011/0161637 A1 * | 6/2011 | Sihn | ....................... G06F 9/5066 |
| | | | 718/104 |
| 2012/0216017 A1 | 8/2012 | Inada | |

(Continued)

FOREIGN PATENT DOCUMENTS

| | | |
|---|---|---|
| CN | 105868016 A | 8/2016 |
| CN | 108108242 A | 6/2018 |

(Continued)

OTHER PUBLICATIONS

Xiao et al., "AntMan: Dynamic Scaling on GPU Clusters for Deep Learning," Proceedings of the 14th USENIX Symposium on Operating Systems Design and Implementation, Nov. 4-6, 2020, 17 pages.
Xu et al., "Salus: Fine-Grained GPU Sharing Primitives for Deep Learning Applications," University of Michigan, 2019, 15 pages.
PCT International Search Report and Written Opinion, dated Apr. 25, 2023, regarding Application No. PCT/CN2023/072569, 8 pages.

*Primary Examiner* — Aimee Li
*Assistant Examiner* — Harrison Li
(74) *Attorney, Agent, or Firm* — Yee & Associates, Inc.

(57) ABSTRACT

A computer implemented method controls in a core dimension packing the plurality of processing unit cores to reduce partial use of the plurality of processing unit cores by concurrently loading into the plurality of processing unit cores: all computational nodes of at least one member selected from the group consisting of the first number of whole groups and the first number of partial groups; and all computation nodes of at least one member selected from the group consisting of the second number of whole groups and the second number of partial groups. According to other illustrative embodiments, a computer system and a computer program product for packing the plurality of processing cores are provided. As a result, the illustrative embodiments can provide a technical effect of increasing the performance in running jobs in a computer system in which partial use of processing unit cores can be reduced.

20 Claims, 16 Drawing Sheets

TIMELINE
750

MEMORY USAGE
730

CORE USAGE
740

(56) References Cited

U.S. PATENT DOCUMENTS

| | | | | |
|---|---|---|---|---|
| 2015/0160979 A1* | 6/2015 | Moffitt | ................. | G06F 9/5066 |
| | | | | 718/104 |
| 2019/0272461 A1* | 9/2019 | Ravindranath | .......... | G06N 3/08 |
| | | | | 718/102 |
| 2021/0311793 A1 | 10/2021 | Gao et al. | | |
| 2023/0144662 A1* | 5/2023 | Tasinga | ................ | G06F 9/5088 |
| | | | | 718/105 |

FOREIGN PATENT DOCUMENTS

| | | |
|---|---|---|
| CN | 107357661 B | 3/2021 |
| CN | 112463349 A | 3/2021 |
| CN | 113553103 A | 10/2021 |
| WO | 2023/143238 A1 | 8/2023 |

* cited by examiner

200

400

| REQUIREMENT >= FREE CORES | REQUIREMENT >= FREE MEMORY | STATUS |
|---|---|---|
| YES | YES | A |
| YES | NO | B |
| NO | YES | C |
| NO | NO | D |

BEFORE: n*m

AFTER: k*m + k*m + ... + k*m
(k+k+ ...+k == n)

200

GPU CARD

MEMORY (2048M)    210

| JOB 1 GPU USAGE: 900M 1 CORE | JOB 2 GPU USAGE: 500M 2 CORES | JOB 3 GPU USAGE: 600M 2 CORES |

230    240    250

PROCESSING CORES (5)    220

710 — MEMORY USAGE    CORE USAGE — 720

TIMELINE 750

MEMORY USAGE 730

CORE USAGE 740

900

900

JOB 1

1010

JOB 2

1020

JOB 3

800M, 1core

1030

INPUT LAYER          HIDDEN DENSE LAYER          HIDDEN DENSE LAYER          OUTPUT LAYER

1040

GPU CARD

MEMORY (2048M)          1050

JOB 1
GPU USAGE:
400M
2 CORES

JOB 2
GPU USAGE:
800M
2 CORES

JOB 3
GPU USAGE:
800M
1 CORE

PROCESSING UNITS (5 CORE)          1060

1150

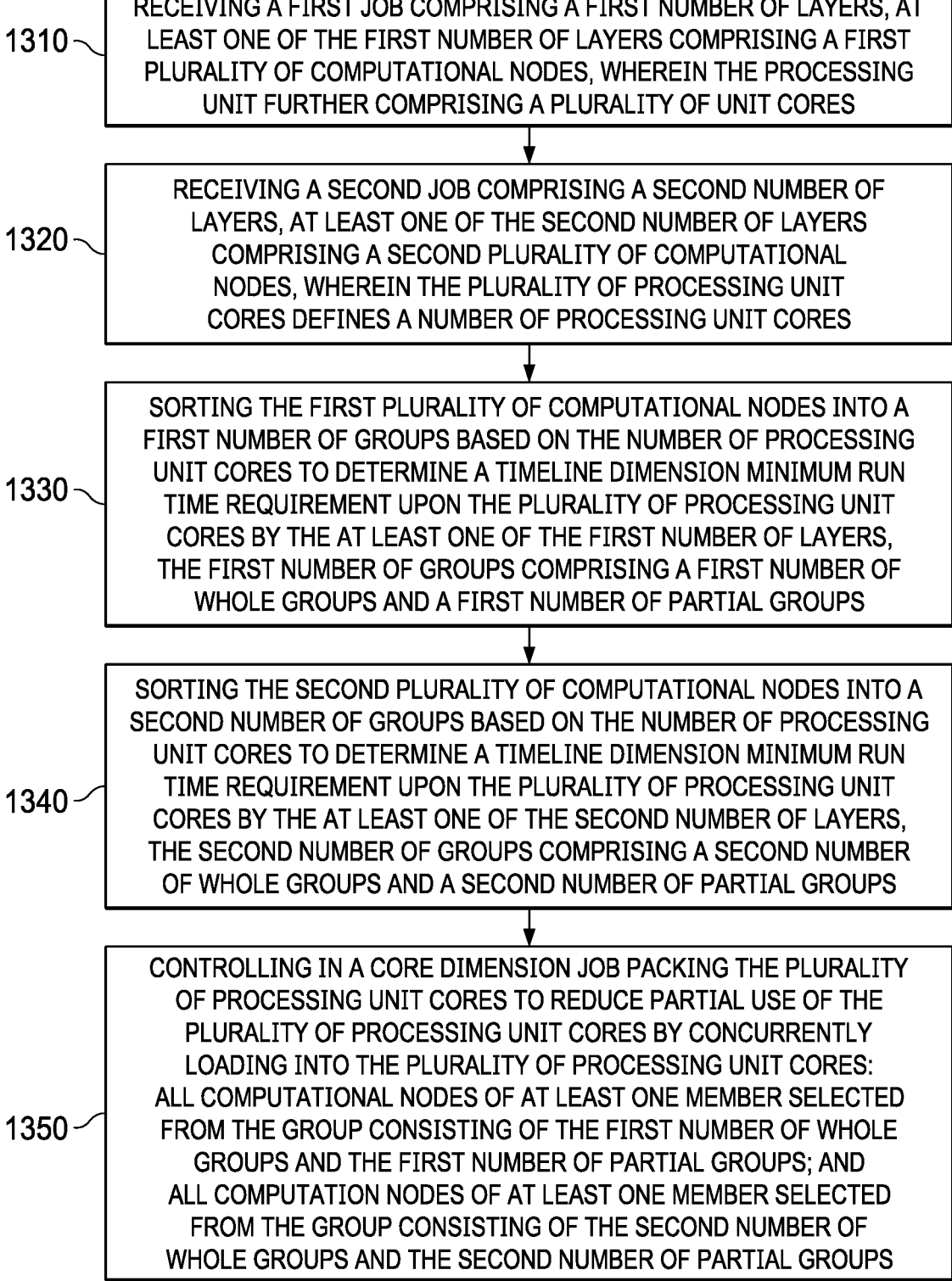

1310 — RECEIVING A FIRST JOB COMPRISING A FIRST NUMBER OF LAYERS, AT LEAST ONE OF THE FIRST NUMBER OF LAYERS COMPRISING A FIRST PLURALITY OF COMPUTATIONAL NODES, WHEREIN THE PROCESSING UNIT FURTHER COMPRISING A PLURALITY OF UNIT CORES

1320 — RECEIVING A SECOND JOB COMPRISING A SECOND NUMBER OF LAYERS, AT LEAST ONE OF THE SECOND NUMBER OF LAYERS COMPRISING A SECOND PLURALITY OF COMPUTATIONAL NODES, WHEREIN THE PLURALITY OF PROCESSING UNIT CORES DEFINES A NUMBER OF PROCESSING UNIT CORES

1330 — SORTING THE FIRST PLURALITY OF COMPUTATIONAL NODES INTO A FIRST NUMBER OF GROUPS BASED ON THE NUMBER OF PROCESSING UNIT CORES TO DETERMINE A TIMELINE DIMENSION MINIMUM RUN TIME REQUIREMENT UPON THE PLURALITY OF PROCESSING UNIT CORES BY THE AT LEAST ONE OF THE FIRST NUMBER OF LAYERS, THE FIRST NUMBER OF GROUPS COMPRISING A FIRST NUMBER OF WHOLE GROUPS AND A FIRST NUMBER OF PARTIAL GROUPS

1340 — SORTING THE SECOND PLURALITY OF COMPUTATIONAL NODES INTO A SECOND NUMBER OF GROUPS BASED ON THE NUMBER OF PROCESSING UNIT CORES TO DETERMINE A TIMELINE DIMENSION MINIMUM RUN TIME REQUIREMENT UPON THE PLURALITY OF PROCESSING UNIT CORES BY THE AT LEAST ONE OF THE SECOND NUMBER OF LAYERS, THE SECOND NUMBER OF GROUPS COMPRISING A SECOND NUMBER OF WHOLE GROUPS AND A SECOND NUMBER OF PARTIAL GROUPS

1350 — CONTROLLING IN A CORE DIMENSION JOB PACKING THE PLURALITY OF PROCESSING UNIT CORES TO REDUCE PARTIAL USE OF THE PLURALITY OF PROCESSING UNIT CORES BY CONCURRENTLY LOADING INTO THE PLURALITY OF PROCESSING UNIT CORES: ALL COMPUTATIONAL NODES OF AT LEAST ONE MEMBER SELECTED FROM THE GROUP CONSISTING OF THE FIRST NUMBER OF WHOLE GROUPS AND THE FIRST NUMBER OF PARTIAL GROUPS; AND ALL COMPUTATION NODES OF AT LEAST ONE MEMBER SELECTED FROM THE GROUP CONSISTING OF THE SECOND NUMBER OF WHOLE GROUPS AND THE SECOND NUMBER OF PARTIAL GROUPS

FIG. 13

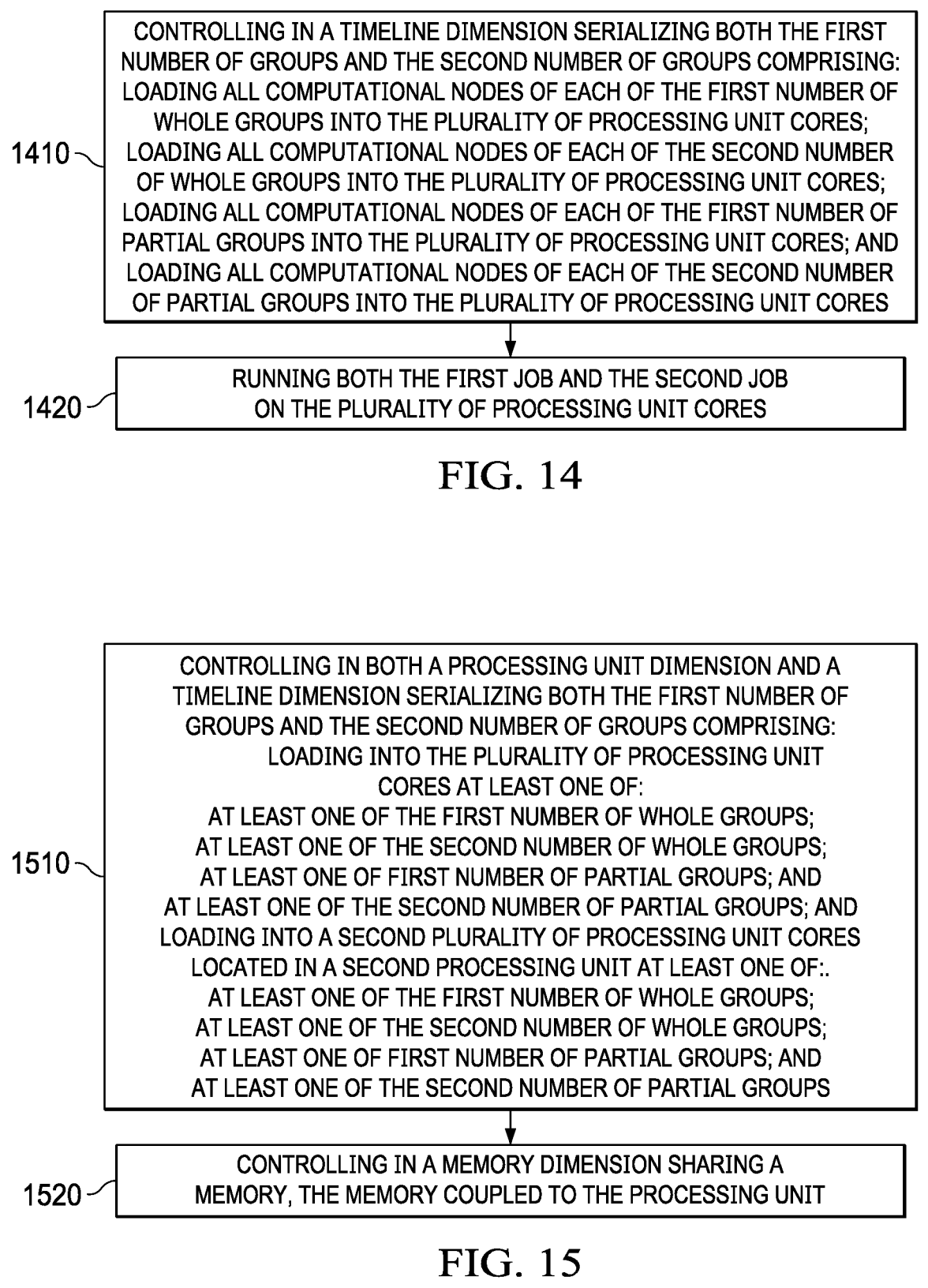

1410 — CONTROLLING IN A TIMELINE DIMENSION SERIALIZING BOTH THE FIRST NUMBER OF GROUPS AND THE SECOND NUMBER OF GROUPS COMPRISING: LOADING ALL COMPUTATIONAL NODES OF EACH OF THE FIRST NUMBER OF WHOLE GROUPS INTO THE PLURALITY OF PROCESSING UNIT CORES; LOADING ALL COMPUTATIONAL NODES OF EACH OF THE SECOND NUMBER OF WHOLE GROUPS INTO THE PLURALITY OF PROCESSING UNIT CORES; LOADING ALL COMPUTATIONAL NODES OF EACH OF THE FIRST NUMBER OF PARTIAL GROUPS INTO THE PLURALITY OF PROCESSING UNIT CORES; AND LOADING ALL COMPUTATIONAL NODES OF EACH OF THE SECOND NUMBER OF PARTIAL GROUPS INTO THE PLURALITY OF PROCESSING UNIT CORES

1420 — RUNNING BOTH THE FIRST JOB AND THE SECOND JOB ON THE PLURALITY OF PROCESSING UNIT CORES

FIG. 14

1510 — CONTROLLING IN BOTH A PROCESSING UNIT DIMENSION AND A TIMELINE DIMENSION SERIALIZING BOTH THE FIRST NUMBER OF GROUPS AND THE SECOND NUMBER OF GROUPS COMPRISING: LOADING INTO THE PLURALITY OF PROCESSING UNIT CORES AT LEAST ONE OF: AT LEAST ONE OF THE FIRST NUMBER OF WHOLE GROUPS; AT LEAST ONE OF THE SECOND NUMBER OF WHOLE GROUPS; AT LEAST ONE OF FIRST NUMBER OF PARTIAL GROUPS; AND AT LEAST ONE OF THE SECOND NUMBER OF PARTIAL GROUPS; AND LOADING INTO A SECOND PLURALITY OF PROCESSING UNIT CORES LOCATED IN A SECOND PROCESSING UNIT AT LEAST ONE OF:. AT LEAST ONE OF THE FIRST NUMBER OF WHOLE GROUPS; AT LEAST ONE OF THE SECOND NUMBER OF WHOLE GROUPS; AT LEAST ONE OF FIRST NUMBER OF PARTIAL GROUPS; AND AT LEAST ONE OF THE SECOND NUMBER OF PARTIAL GROUPS

1520 — CONTROLLING IN A MEMORY DIMENSION SHARING A MEMORY, THE MEMORY COUPLED TO THE PROCESSING UNIT

FIG. 15

CONTROLLING JOB PACKING PROCESSING UNIT CORES FOR GPU SHARING

BACKGROUND

1. Field

The present invention relates generally to an improved computer system and more specifically to job packing for graphical processing unit sharing.

2. Description of the Related Art

In the world of artificial intelligence (AI), a key resource is a graphical processing unit (GPU) for model training job and inference job execution. Nowadays, graphical processing unit is very powerful and relatively inexpensive. A single graphical processing unit card may have a very large memory size and large number of cores.

Inference jobs are real-time, short run time but have various demands of memory and core of the graphical processing unit resource. Typically, one inference job cannot consume the full capability of a single graphical processing unit card. Therefore, one of the most important success factors in AI industry is how to maximize the graphical processing unit utilization but still proceed with high throughput of various inference jobs. However, there is no mature solution to achieve this.

Some schedulers achieve graphical processing unit sharing based on time-slice scheduling and treat a whole graphical processing unit card as minimal resource unit. However, this approach only dispatches one job to a graphical processing unit card which leads to graphical processing unit resource waste. Consequently, this is not real graphical processing unit sharing.

Some schedulers can dispatch multiple jobs into one graphical processing unit card. However, these approaches are prone to out-of-memory error.

Therefore, it would be desirable to have a method and apparatus that take into account at least some of the issues discussed above, as well as other possible issues. For example, it would be desirable to have a method and apparatus that overcome a technical problem with increasing the efficiency of running jobs, such as model training jobs.

SUMMARY

According to one illustrative embodiment, a computer system for scheduling job packing for graphical processing unit sharing is provided. The computer system comprising a processing unit comprising a plurality of cores receives a first job comprising a first number of layers, at least one of the first number of layers comprising a first plurality of computational nodes. The computer system receives a second job comprising a second number of layers, at least one of the second number of layers comprising a second plurality of computational nodes. The plurality of processing unit cores defines a number of processing unit cores. The computer system sorts the first plurality of computational nodes into a first number of groups based on the number of processing unit cores to determine a timeline dimension minimum run time requirement upon the plurality of processing unit cores by the at least one of the first number of layers, the first number of groups comprising a first number of whole groups and a first number of partial groups. The computer system sorts the second plurality of computational nodes into a second number of groups based on the number of processing unit cores to determine a timeline dimension minimum run time requirement upon the plurality of processing unit cores by the at least one of the second number of layers, the second number of groups comprising a second number of whole groups and a second number of partial groups. The computer system controls in a core dimension job packing the plurality of processing unit cores to reduce partial use of the plurality of processing unit cores by concurrently loading into the plurality of processing unit cores: all computational nodes of at least one member selected from the group consisting of the first number of whole groups and the first number of partial groups; and all computation nodes of at least one member selected from the group consisting of the second number of whole groups and the second number of partial groups.

According to other illustrative embodiments, a computer implemented method and a computer program product for core dimension job packing are provided. As a result, the illustrative embodiments can provide a technical effect of increasing the performance in running jobs in a computer system in which at least one of overall throughput of job processing is increased, wait times for running jobs is reduced, or resources held by job processors is reduced at any given time.

The illustrative embodiments can permissively control, by the computer system comprising the processing unit, in a memory dimension sharing a memory, the memory coupled to the processing unit. As a result, the illustrative embodiments can provide a technical effect of increasing the performance in running jobs in a computer system in which at least one of overall throughput of job processing is increased, wait times for running jobs is reduced, or resources held by job processors is reduced at any given time through using predictions of future jobs to manage job processing pools.

The illustrative embodiments can permissively comprise wherein the first job further comprises a first inference job and the second job further comprises a second inference job. As a result, the illustrative embodiments can provide a technical effect of increasing the performance in running jobs in a computer system in which at least one of overall throughput of job processing is increased, wait times for running jobs is reduced, or resources held by job processors is reduced at any given time by selectively removing idle job processors.

The illustrative embodiments can permissively comprise wherein the processing unit further comprises a graphical processing unit and each of the plurality of processing unit cores further comprises a graphical processing unit core. As a result, the illustrative embodiments can provide a technical effect of increasing the performance in running jobs in a computer system in which at least one of overall throughput of job processing is increased, wait times for running jobs is reduced, or resources held by job processors is reduced at any given time through using predictions of future jobs to manage job processing pools.

The illustrative embodiments can also permissively control, by the computer system comprising the processing unit, in a timeline dimension serializing both the first number of groups and the second number of groups comprising: loading all computational nodes of each of the first number of whole groups into the plurality of processing unit cores; loading all computational nodes of each of the second number of whole groups into the plurality of processing unit cores; loading all computational nodes of each of the first number of partial groups into the plurality of processing unit cores; and loading all computational nodes of each of the second number of partial groups into the plurality of processing unit cores. As a result, the illustrative embodiments can provide a technical effect of increasing the performance in running jobs in a computer system in which at least one of overall throughput of job processing is increased, wait times for running jobs is reduced, or resources held by job processors is reduced at any given time by running jobs that have run times greater than some desire threshold running jobs in the job processing pools in a separate job processor for that job.

The illustrative embodiments can also permissively run, by the computer system comprising the processing unit, both the first job and the second job on the plurality of processing unit cores. As a result, the illustrative embodiments can provide a technical effect of increasing the performance in running jobs in a computer system in which at least one of overall throughput of job processing is increased, wait times for running jobs is reduced, or resources held by job processors is reduced at any given time by running jobs that have run times greater than some desire threshold running jobs in the job processing pools in a separate job processor for that job.

BRIEF DESCRIPTION OF THE DRAWINGS

FIGS. 11A-10E are diagrams illustrating a GPU card (E) and four jobs (A-D) in accordance with an illustrative embodiment;

FIG. 13 is a flow chart of a series of operations in accordance with an illustrative embodiment;

FIG. 14 is a flow chart of a series of operations in accordance with an illustrative embodiment;

FIG. 15 is a flow chart of a series of operations in accordance with an illustrative embodiment.

DETAILED DESCRIPTION

Figure 1:
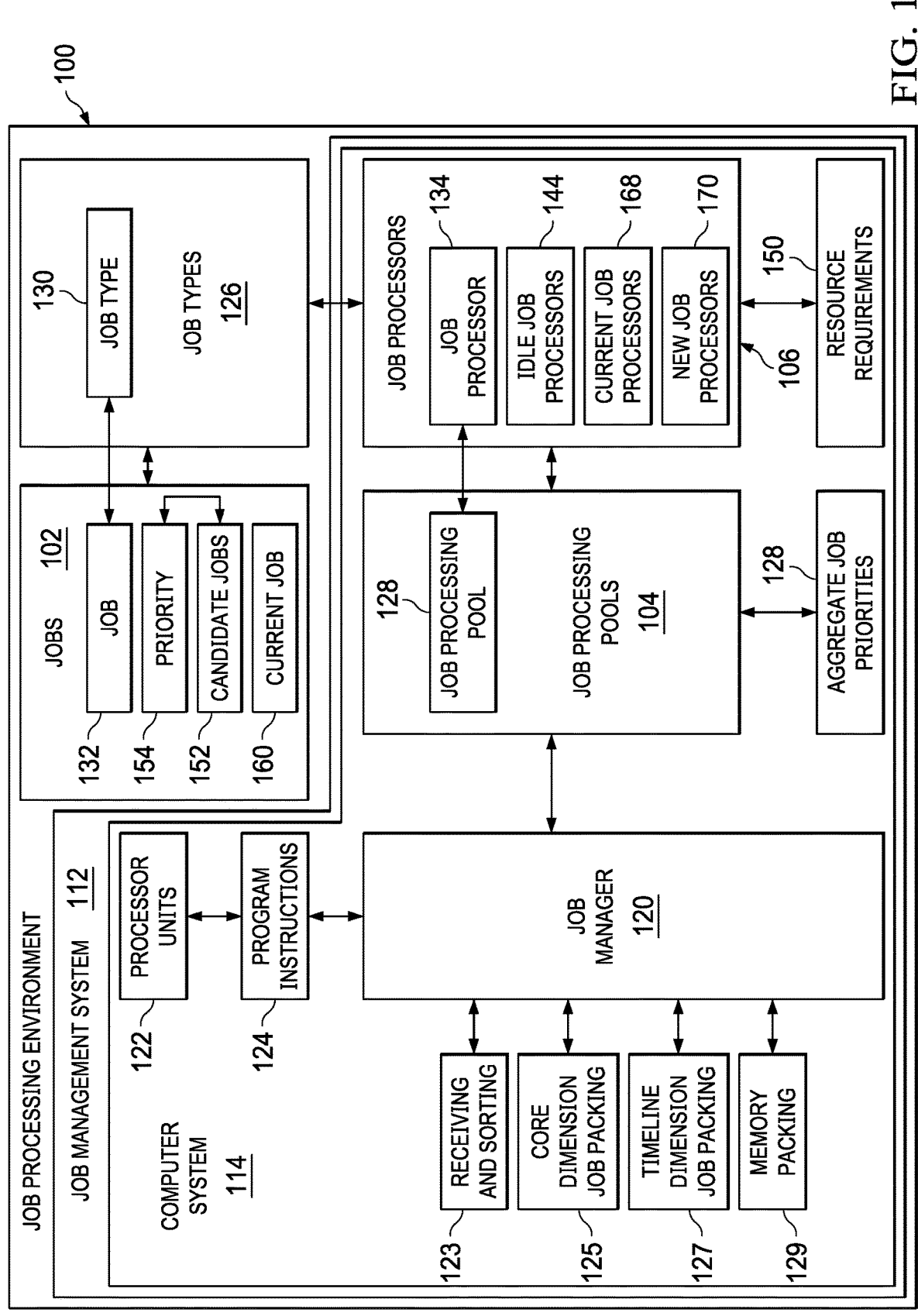
FIG. 1 is a block diagram of a job processing environment in accordance with an illustrative embodiment.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer-implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Embodiments of this disclosure can include a GPU (graphical processing unit) sharing schedule method for inference jobs to parallelize high volume of jobs with different memory/core demand on one GPU card to maximum GPU resources utilization from both memory and core dimensions. This method 1) gets and analyzes inference job information, such as model layer and structure, computes memory and core requirement based on job information, 2) provides a way to manage jobs' memory and core usage, then 3) designs a policy and method to pack and dispatch jobs into GPU card to full fill memory/core resources, meanwhile 4) handles extreme large memory/core usage jobs submission.

First, the model structure of deep learning inference job is determined, and the memory size required by each layer is known. Therefore, the maximum memory usage during runtime is calculable. This disclosure introduces dynamic memory management (DMM) based on memory swap technology. The runtime memory consumption is controllable by swapping layers in/out GPU memory without break job.

Second, the number of computational nodes in each layer determines the number of GPU cores required and those nodes can be divided into multiple groups. Hence the runtime core consumption of a layer is controllable by grouping (sorting) technique. The maximum core usage of an inference job is controllable via splitting nodes in the largest layer(s). This disclosure leverages Dynamic Core Management (DCM) to implements splitting nodes in same layer into several groups, serializing these groups, loading all nodes in one group to GPU core in one shot.

Lastly, to orchestrate the high volume of inference job submissions, a scheduler can be introduced to schedule all jobs from multiple dimensions, including GPU memory, GPU core and timeline. For memory and core dimension, scheduler collects memory and core usage information and selects suitable jobs based on policy to pack and dispatch. From the timeline dimension, the scheduler can dynamically pack new jobs into a GPU card to full fill after some jobs release memory and core resources. To select a suitable job, if there are sufficient resources for that job's requirement, that job will be simple to pack and dispatch. When unused memory and core resource cannot meet the demand of new jobs, the scheduler can use the DCM and/or DMM techniques to free up non-mandatory resources consumption until free resource meet a job requirement.

As used herein, "a number of" when used with reference to items, means one or more items. For example, "a number of different types of networks" is one or more different types of networks.

Further, the phrase "at least one of," when used with a list of items, means different combinations of one or more of the listed items can be used, and only one of each item in the list may be needed. In other words, "at least one of" means any combination of items and number of items may be used from the list, but not all of the items in the list are required. The item can be a particular object, a thing, or a category.

For example, without limitation, "at least one of item A, item B, or item C" may include item A, item A and item B, or item B. This example also may include item A, item B, and item C or item B and item C. Of course, any combinations of these items can be present. In some illustrative examples, "at least one of" can be, for example, without limitation, two of item A; one of item B; and ten of item C; four of item B and seven of item C; or other suitable combinations.

With reference now to FIG. 1, a block diagram of a job processing environment is depicted in accordance with an illustrative embodiment. In this illustrative example, job processing environment 100 includes components that can be implemented in hardware such as the hardware shown in FIG. 16.

As depicted, job processing environment 100 is an environment in which jobs 102 are processed by job processing pools 101 having job processors 106.

Jobs 102 can take a number of different forms. For example, jobs 102 can be selected from at least one of a model training job for training a machine learning model, a scheduling job for semiconductor fabrication operation, an order processing job, or other suitable types of tasks or operations.

Job processors 106 can take a number of different forms. For example, job processors 106 can be selected from at least one of a container, a thread, a process, an application, an operating system instance, a virtual machine, a host, a cluster, a processing unit, or other suitable type of processing component.

In this illustrative example, job management system 112 can manage job processing pools 104 and running jobs 102. In this illustrative example, job management system 112 comprises computer system 114 and job manager 120.

Job manager 120 is located in computer system 114 and can be implemented in software, hardware, firmware, or a combination thereof. When software is used, the operations performed by job manager 120 can be implemented in program instructions configured to run on hardware, such as a processor unit. When firmware is used, the operations performed by job manager 120 can be implemented in program instructions and data and stored in persistent memory to run on a processor unit. When hardware is employed, the hardware can include circuits that operate to perform the operations in job manager 120.

In the illustrative examples, the hardware can take a form selected from at least one of a circuit system, an integrated circuit, an application specific integrated circuit (ASIC), a programmable logic device, or some other suitable type of hardware configured to perform a number of operations. With a programmable logic device, the device can be configured to perform the number of operations. The device can be reconfigured at a later time or can be permanently configured to perform the number of operations. Programmable logic devices include, for example, a programmable logic array, a programmable array logic, a field programmable logic array, a field programmable gate array, and other suitable hardware devices. Additionally, the processes can be implemented in organic components integrated with inorganic components and can be comprised entirely of organic components excluding a human being. For example, the processes can be implemented as circuits in organic semiconductors.

Computer system 114 is a physical hardware system and includes one or more data processing systems. When more than one data processing system is present in computer system 114, those data processing systems are in communication with each other using a communications medium. The communications medium can be a network. The data processing systems can be selected from at least one of a computer, a server computer, a tablet computer, or some other suitable data processing system.

As depicted, computer system 114 includes a number of processor units 122 that are capable of executing program instructions 124 implementing processes in the illustrative examples. As used herein, a processor unit in the number of processor units 122 is a hardware device and is comprised of hardware circuits such as those on an integrated circuit that respond and process instructions and program code that operate a computer. When a number of processor units 122 execute program instructions 124 for a process, the number of processor units 122 is one or more processor units that can be on the same computer or on different computers. In other words, the process can be distributed between processor units on the same or different computers in a computer system. Further, the number of processor units 122 can be of the same type or different type of processor units. For example, a number of processor units can be selected from at least one of a single core processor, a dual-core processor, a multi-processor core, a general-purpose central processing unit (CPU), a graphics processing unit (GPU), a digital signal processor (DSP), or some other type of processor unit.

Embodiments of this disclosure include one or more processor units 122 that are selected from at least one of a dual-core processor, a multi-core processor or a graphic processing unit (GPU). Preferred embodiments of this disclosure include one or more graphic processer units each of which has multiple cores.

Job manager 120 includes controlling receiving and sorting 123. Job manager 120 includes controlling core dimension job packing 125. Job manager 120 includes controlling timeline dimension job packing 127. Job manager 120 includes controlling memory packing 129.

In this illustrative example, job manager 120 in job management system 112 manages running jobs 102 using job processing pools 104 based on job types 126. Each job processing pool is configured to process jobs 102 of the same job type. For example, job processing pool 128 is for running jobs 102 of job type 130 in job types 126. Job processors 106 in job processing pool 128 in job processing pools 104 are configured or designed to run jobs 102 that are all of job type 130. In the illustrative example, another job processing pool in job processing pools 104 can comprise other job processors 106 for running jobs 102 of a different job type from job type 130 for job processors 106. As a result, different job processing pools can process jobs of different job types in job types 126.

In this illustrative example, job manager 120 can receive job 132 having job type 130. Job manager 120 can identify job processing pool 128 in job processing pools 104 for running jobs 102 of job type 130. Job processing pool 128 comprises job processors 106 for running jobs 102 of job type 130. Job manager 120 runs job 132 having job type 130 using job processor 134 in job processing pool 128 for job type 130.

In running job 132, job manager 120 can run job 132 using job processor 134 in job processing pool 128 for job type 130 in response to job processor 134 in job processing pool 128 for job type 130 being available to run job 132.

In another illustrative example, when a job processor is unavailable, job manager 120 can perform a number of different steps to run job 132. For example, job manager 120 can determine whether job processor 134 of job type 130 can be added to job processing pool 128 to run job 132 having job type 130. Job manager 120 can add job processor 134 of job type 130 to job processing pool 128 in response to a determination that job processor 134 of job type 130 can be added to job processing pool 128 to run job 132 having job type 130. Job manager 120 can then run job 132 using job processor 134.

In adding job processor 134, job manager 120 can remove a set of idle job processors 144 to free up resources for adding job processor 134. In illustrative example, a job processor can be in an idle state waiting for a job or running a job. In both states, the job processor holds processing resources. Job manager 120 can add job processor 134 of job type 130 to run job 132 having job type 130 in response to freeing up resources.

In the illustrative example, jobs 102 can have different priorities in addition to having different job types. An aggregate job priority can be determined for each job processing pool. The aggregate job priority for a job processing pool is the aggregate or some of the priorities for jobs being processed in the job processing pool.

Job manager 120 can add job processor 134 of job type 130 to job processing pool 128 in response to removing idle job processors 144 such that a sufficient amount of resources are freed up.

In still another illustrative example, in adding job processor 134, job manager 120, can identify a set of candidate jobs 152 having priority 154 that is lower than jobs 102. The resources released by moving the set of candidate jobs 152 are sufficient to add job processor 134 of job type 130. In managing resources, job manager 120 can also selectively remove job processors 106.

A job can run longer than expected or desired because of factors such as inputs, delays, dependencies, interactions, or other factors. As a result, job management system 112 can be optimized to process shorter running jobs. Long-running jobs can be processed using job processors outside of job processing pools 104.

In one illustrative example, one or more technical solutions are present that overcome a technical problem with running jobs with a desired level efficiency. As a result, one or more technical solutions can provide a technical effect of increasing the performance in running jobs in a computer system in which at least one of overall throughput of job processing is increased, wait times for running jobs is reduced, or resources held by job processors is reduced at any given time. In the illustrative example, the overall throughput in running jobs can be increased within different time intervals. Further, the wait times across the different types of jobs also can be reduced. In other words, job processors can be made available for running jobs immediately or as soon as possible. Further, the management of container resources held across different containers can be reduced at any given time. Further, these efficiencies can take into account job priorities in running jobs.

Computer system 114 can be configured to perform at least one of the steps, operations, or actions described in the different illustrative examples using software, hardware, firmware, or a combination thereof. As a result, computer system 114 operates as a special purpose computer system in which job manager 120 in computer system 114 enables improving the efficiency at which jobs can be run by computer system 114. In particular, job manager 120 transforms computer system 114 into a special purpose computer system as compared to currently available general computer systems that do not have job manager 120.

In the illustrative example, the use of job manager 120 in computer system 114 integrates processes into a practical application for running jobs that increases the performance of computer system 114. In other words, job manager 120 in computer system 114 is directed to a practical application of processes integrated into job manager 120 in computer system 114 that identifies a job processing pool based on the job type of a job that is to be run.

The illustration of job processing environment 100 in FIG. 1 is not meant to imply physical or architectural limitations to the manner in which an illustrative embodiment can be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

For example, job processing pools 104 can have two job processing pools that process jobs 102 of the same job type. With this example, job processing pools 104 still cover processing all of job types 126 for jobs 102. Duplicate job processing pools can be present in some illustrative examples.

Figure 2:
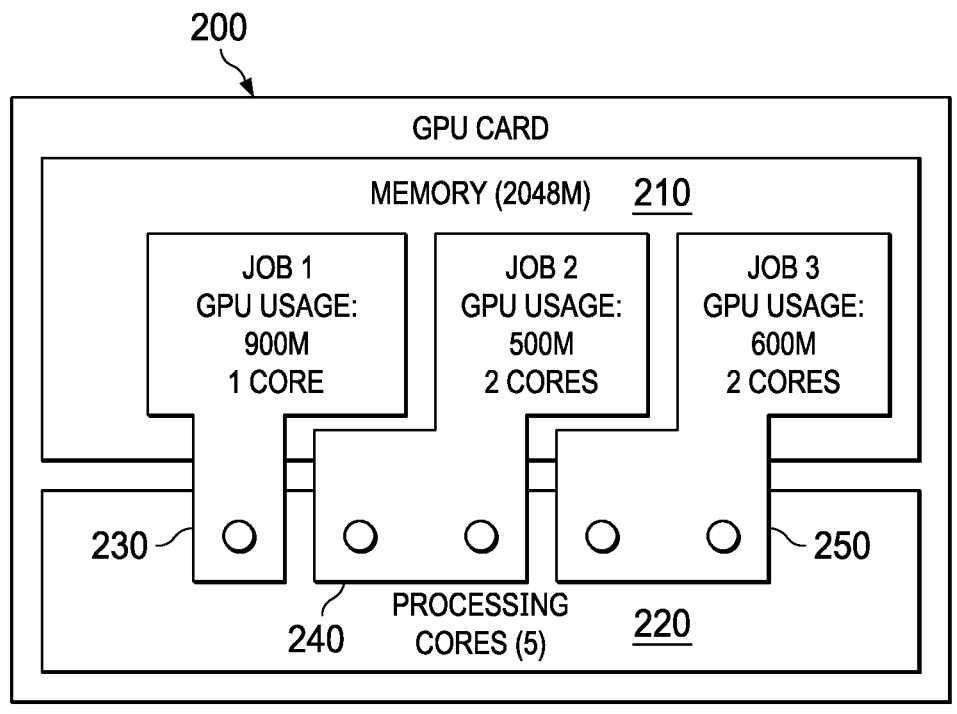
FIG. 2 is a diagram illustrating a GPU card in accordance with an illustrative embodiment.

With reference now to FIG. 2, a diagram illustrating a GPU card 200 is depicted in which illustrative embodiments may be implemented. The GPU card 200 includes a memory 210. The GPU card 200 includes a plurality of processing cores 220. In this illustrative example, the plurality of processing cores 220 includes five processing cores.

In this illustrative example, there are 3 jobs resident in the memory 210 and plurality of processing cores 220, of the GPU card 200. Job 1 230 occupies a GPU card memory usage of 900M and core usage of one core. Job 2 240 occupies a GPU card memory usage of 500M and core usage of two cores. Job 3 250 occupies a GPU card memory usage of 600M and core usage of 2 cores.

In this illustrative example, a GPU sharing schedule method for inference jobs to maximum GPU utilization in both memory and core dimensions is presented. This method will get and analyze job information, such as model layer, memory requirement and core requirement, etc. This method will provide a way to manage memory/core usage of jobs. This method will provide a way to pack jobs into GPU cards to full fill memory/core resources. This method will handle extreme large memory usage of one job to increase the overall core utilization of GPU This method will handle extreme large core usage of one job to increase the overall memory utilization of GPU.

Figure 3:
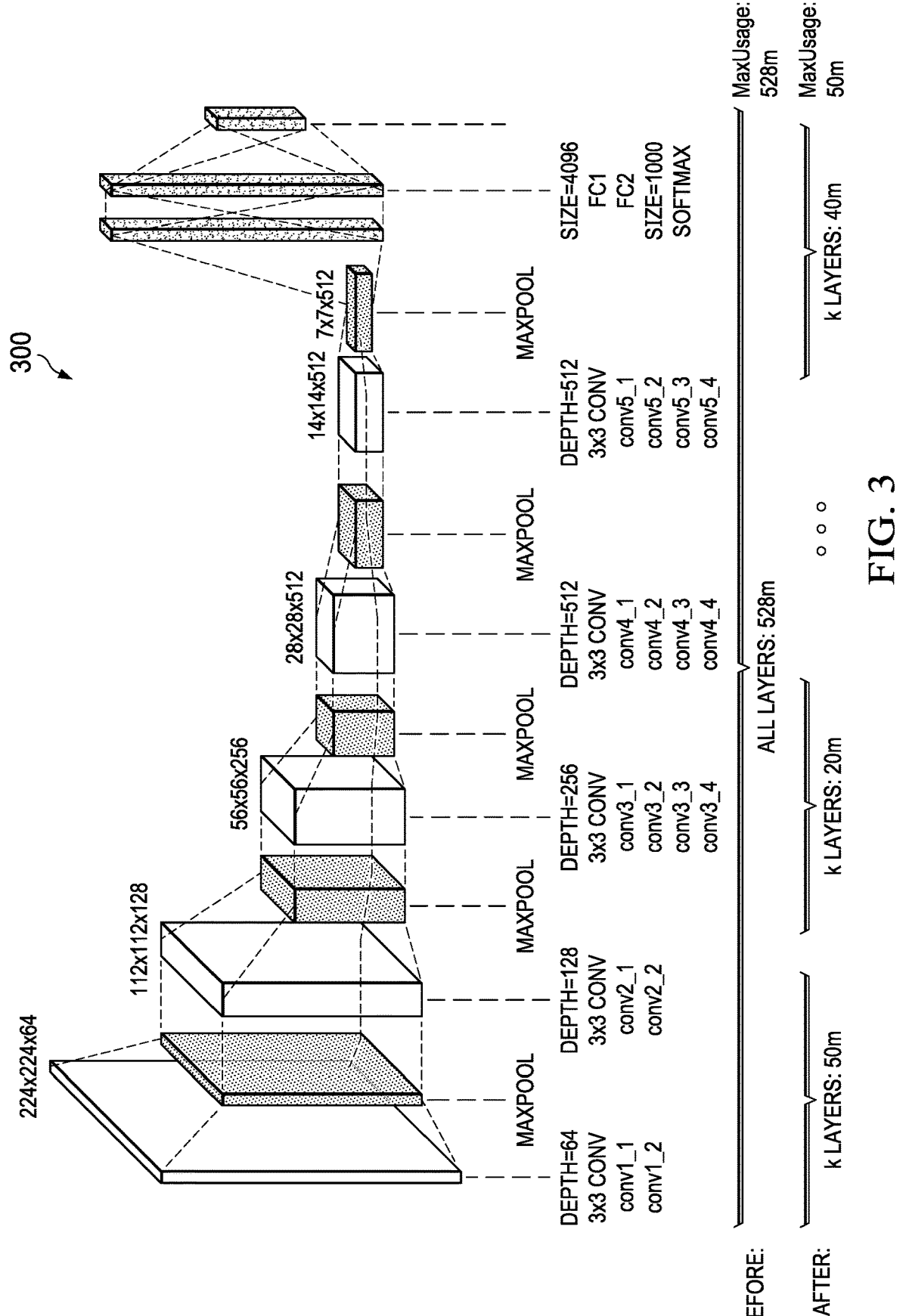
FIG. 3 is a diagram illustrating abstraction model layers of an inference job in accordance with an illustrative embodiment.

With reference now to FIG. 3, a diagram illustrating abstraction model layers of an inference job 300 is depicted in which illustrative embodiments may be implemented. In this illustrative example, for memory analysis (e.g. deep learning inference jobs), the structure of the deep network model is determined and the memory usage of each layer of the model is known. Consequently, the maximum memory usage of an inference job is calculable and the memory usage is controllable by controlling the layers that load to memory. Dynamic memory management can be based on memory swap technology. This can control memory usage by loading a part of the layer of a model dynamically.

Figure 4:
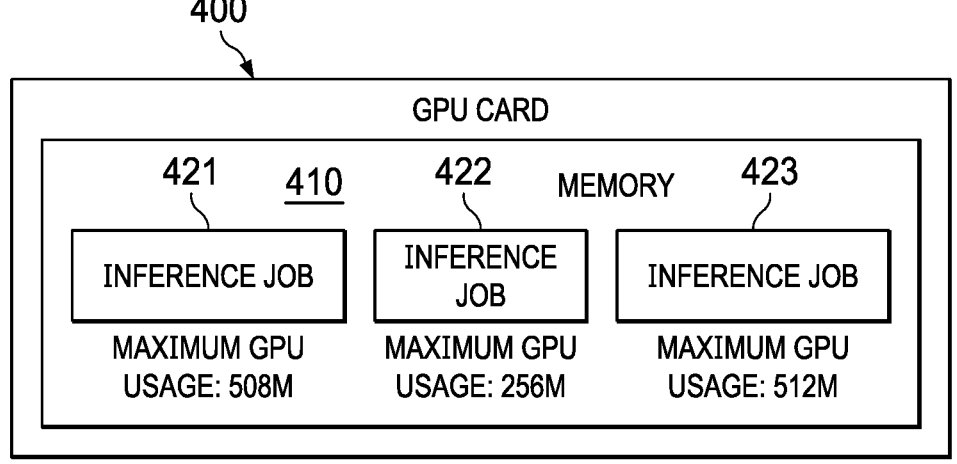
FIG. 4 is a diagram illustrating a GPU card in accordance with an illustrative embodiment.

With reference now to FIG. 4, a diagram illustrating a GPU card 400 is depicted in which illustrative embodiments may be implemented. In this illustrative example, for dynamic memory management three inference jobs are loaded into the memory 410 of one GPU card. The first inference job 421 has a maximum GPU memory usage of 508M. The second inference job 422 has a maximum GPU memory usage of 256M. The third inference job 423 has a maximum GPU memory usage of 512M.

Figures 5, 8:
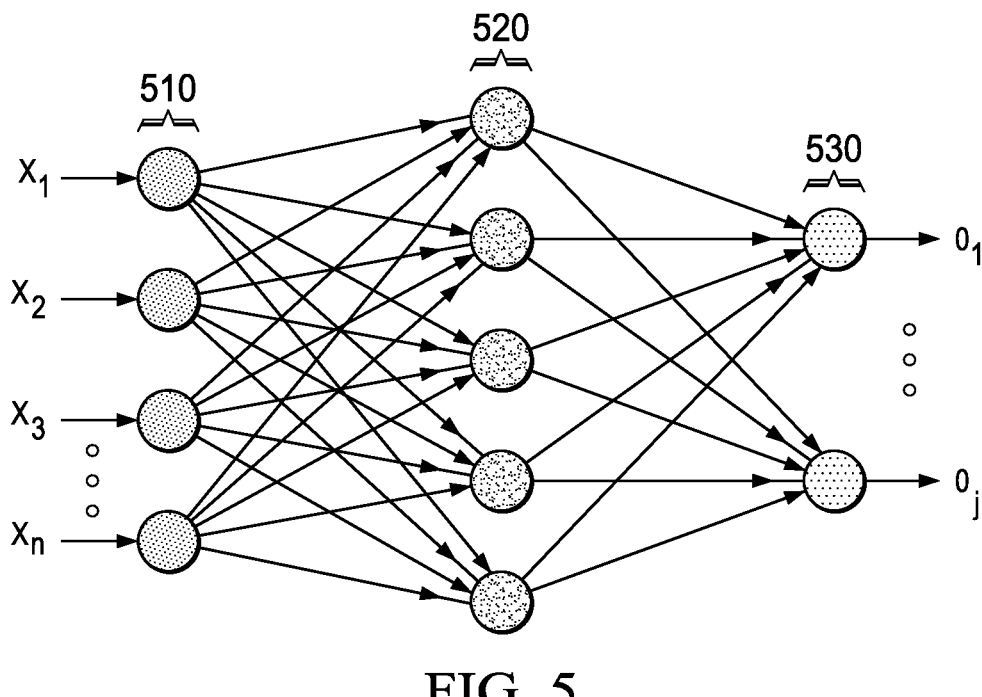
FIG. 5 is a diagram illustrating abstraction model layers of an inference job in accordance with an illustrative embodiment.
FIG. 8 is a diagram illustrating status of jobs based on their free core and free memory requirements compared to free core and free memory availability in accordance with an illustrative embodiment.

With reference now to FIG. 5, a diagram illustrating abstraction model layers of an inference job is depicted in which illustrative embodiments of this disclosure may be implemented. First layer 510 includes 4 nodes. Second layer 520 includes 5 nodes. Third layer 530 includes 2 nodes. In this illustrative example, for core analysis of deep learning inference jobs, the number of nodes of each layer determines the number of cores to use for that layer. The operation of nodes can be split across multiple cores. Consequently, the core usage of a layer in an inference job is controllable by splitting the nodes in the layer. The maximum core usage of an inference job is controllable by splitting the nodes in the largest layer. The invention is not limited to graphical processing unit cards; and the invention can be embodied in generic multi-core processing units. The invention is not limited to inference jobs; and the invention can be embodied in generic jobs that are capable of being split across multiple cores.

Figure 6A:
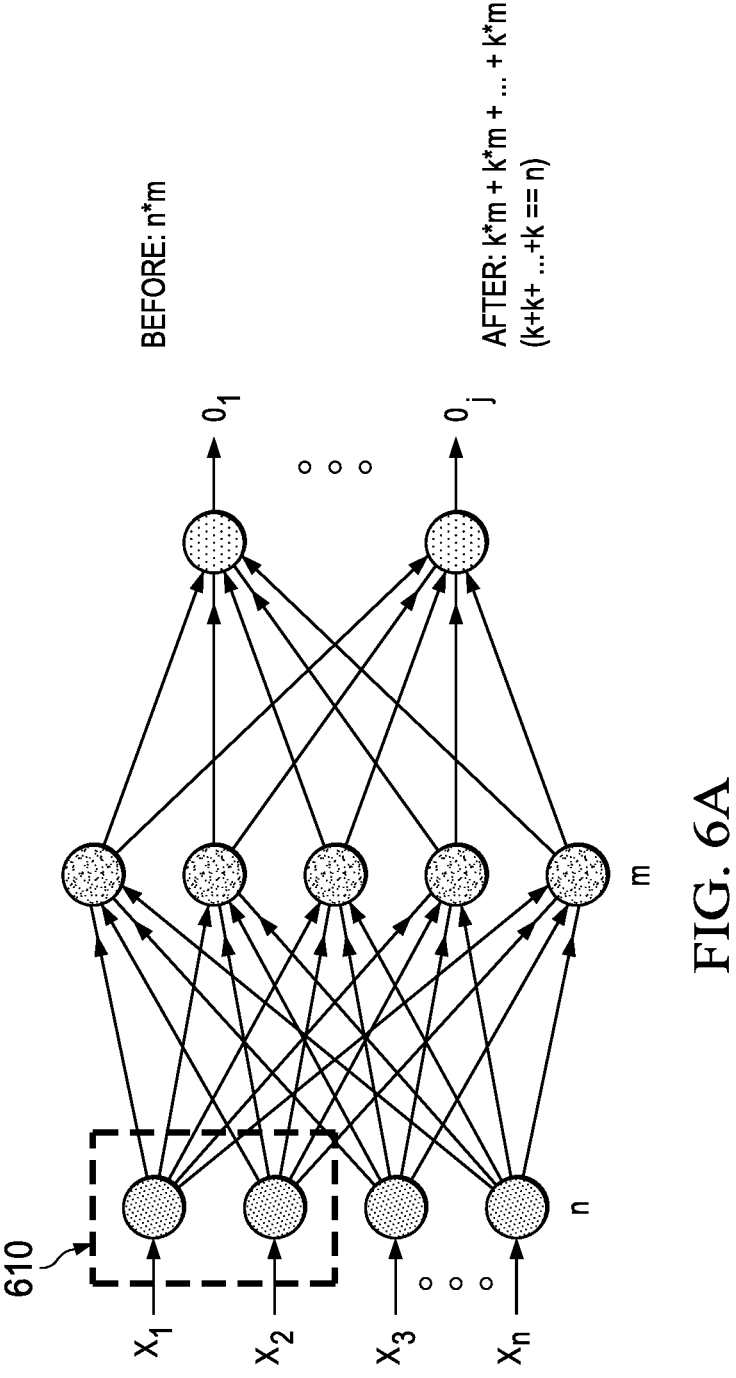
FIG. 6A is a diagram illustrating abstraction model layers of an inference job in accordance with an illustrative embodiment.

With reference now to FIG. 6A, a diagram illustrating abstraction model layers of an inference job is depicted in which illustrative embodiments may be implemented. In this illustrative example, nodes in a layer are split into several groups. Group 610 includes 2 nodes. Nodes in a group are executed at the same time.

Figure 6B:
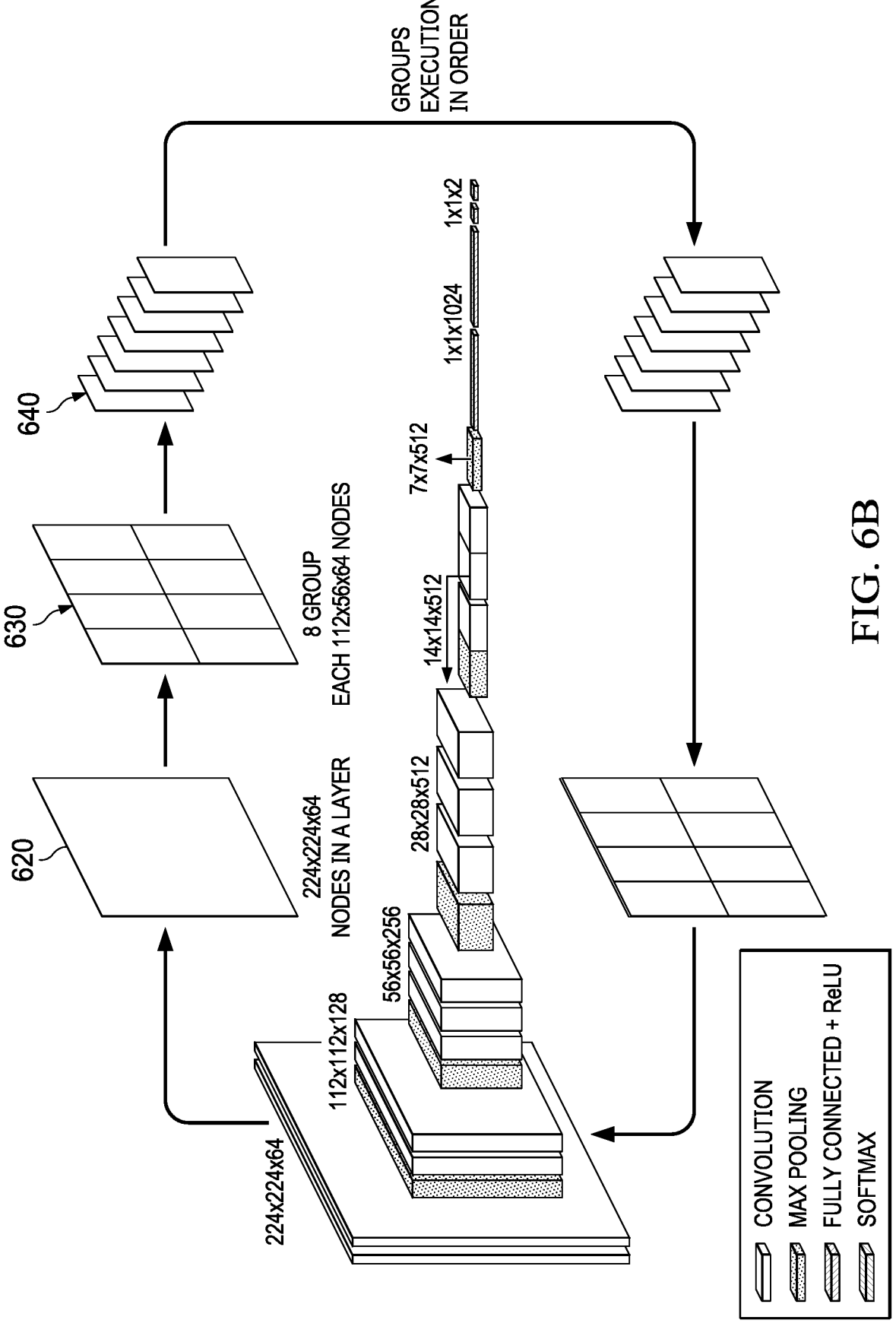
FIG. 6B is a diagram illustrating methodological progressions of layers in context in accordance with an illustrative embodiment.

With reference now to FIG. 6B, a diagram illustrating methodological progressions of layers in context is depicted in which illustrative embodiments may be implemented. Embodiments of this disclosure are useful to improve performance of computer systems because layers containing many nodes can be controllably job packed into a plurality of processing unit cores, optionally across a plurality of GPUs. A layer 620 includes 224×224×64 nodes. These nodes are distributed into 8 equal groups 630. In this illustrative example, nodes in different groups are executed in an order 640. After execution, the nodes in different groups can be returned to their original arrangement. Embodiments of this disclosure can implement PyTorch policy, details of which are readily openly and commercially available.

Figure 7A:
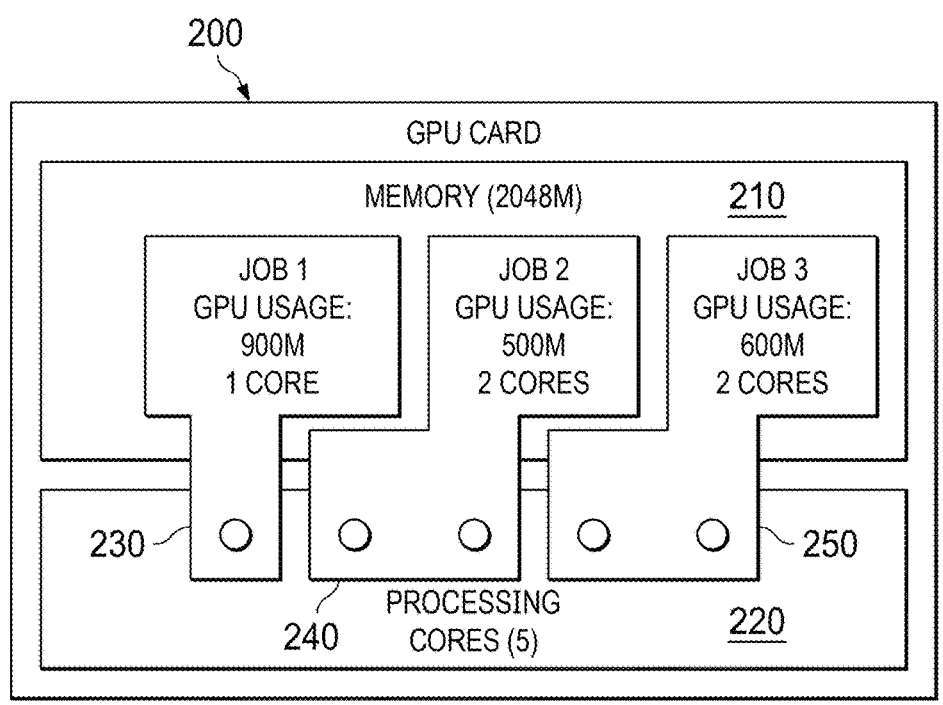
FIGS. 7A-7C are diagrams illustrating a GPU card (A) and multi-dimensional characterizations of usage (B-C) of that card in accordance with an illustrative embodiment.
Figure 7B:
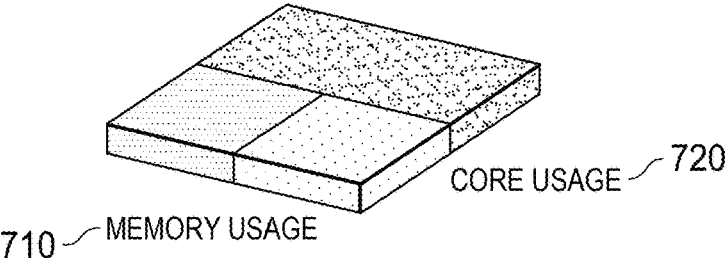
Figure 7C:
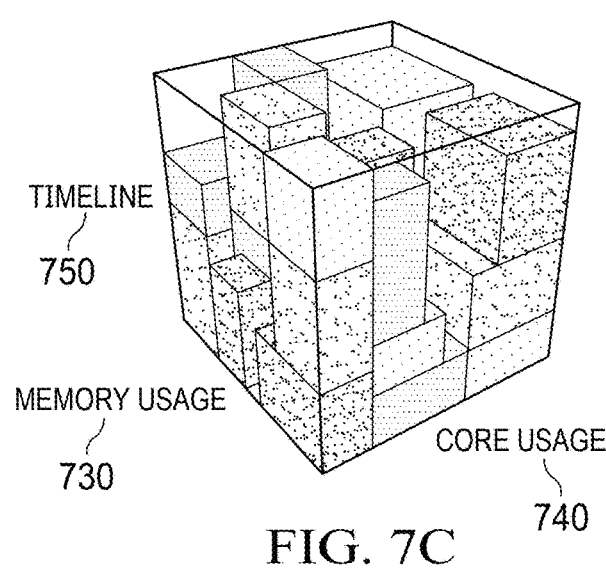

With reference now to FIGS. 7A-7C, diagrams illustrating a GPU card (FIG. 7A) and multi-dimensional characterizations of usage (FIGS. 7B-7C) of that card are depicted in which illustrative embodiments may be implemented. In this illustrative example, details of time domain scheduling with memory/core management are shown. In FIG. 7B, the resource requirements of the 3 jobs in FIG. 7A are mapped in 2 dimensions. The 2 dimensions include memory usage 710 and core usage 720. For memory/core usage dimension, first collect the memory/core usage of the GPU card and then second select suitable jobs to pack to full fill the GPU memory/cores. In FIG. 7C, the resource requirements of the 3 jobs are re-mapped into 3 dimensions. The 3 dimension include memory usage 3d 730, core usage 3d 740 and timeline 3d 750. For timeline dimension, dynamically pack new jobs into the GPU card to fill the GPU card after some jobs are finished.

With reference now to FIG. 8, a diagram illustrating status 810 of jobs based on their free core requirement compared to free core availability 820 and free memory requirement compared to free memory availability 830 is depicted in which illustrative embodiments may be implemented. In this illustrative example, the question of how to select suitable jobs for GPU packing from candidate jobs is answered. First, pick jobs dynamically one by one until the requirement of selected jobs meet status A or there are no more jobs. Second, if the requirement for core is bigger than the free cores, reduce the core requirement to meet the free cores by dynamic core management as described in the previous figures. Third, if the requirement of memory is bigger than the free memory, reduce the memory requirement to meet the free memory by dynamic memory management as described in the previous figures. Fourth, put the selected jobs into the graphical processing unit.

Figure 9A:
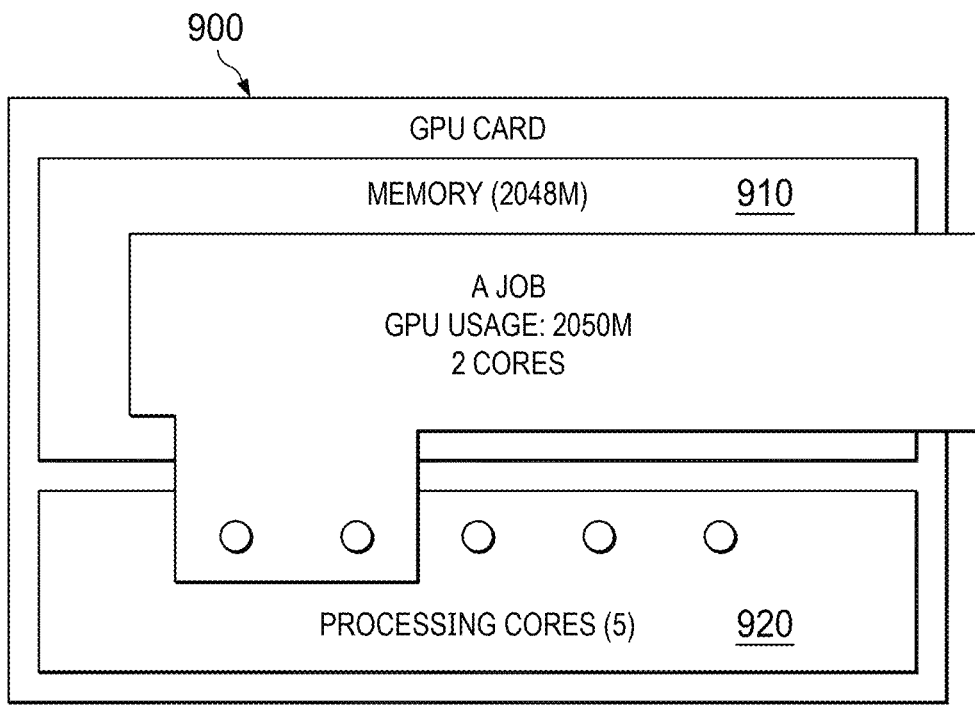
FIGS. 9A-9B are diagrams illustrating a GPU card in two different packing states in accordance with an illustrative embodiment.
Figure 9B:
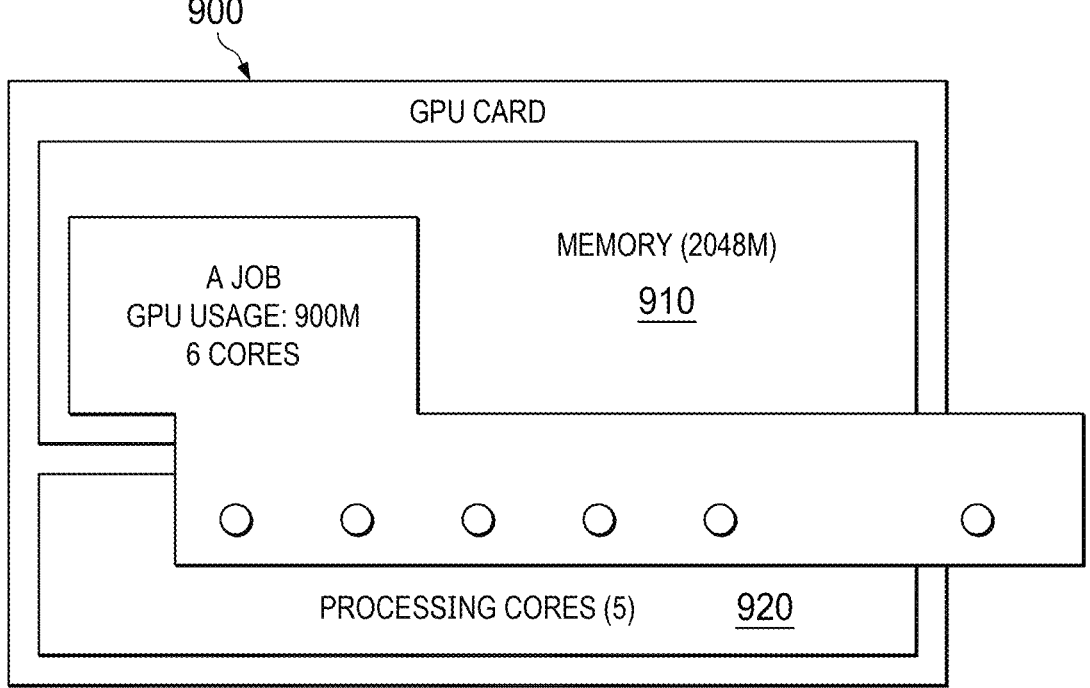

With reference now to FIGS. 9A-9B, diagrams illustrating a GPU card 900 in two different packing states are depicted in which illustrative embodiments may be implemented. In these illustrative examples, a first special case, case 1, is shown in FIG. 9A. A second special case, case 2, is shown in FIG. 9 B. In case 1, GPU memory 910 is used up by a single job. Meanwhile, GPU cores 920 are still free in case 1. In this case 1, memory usage of this job can be reduced by dynamic memory management. In case 2, GPU cores 920 are used up by a single job. Meanwhile, GPU memory is free in this case 2. In this case 2, core usage of this job can be reduced by dynamic core management.

Algorithm:

Pick jobs dynamically one by one until the requirement of selected jobs is bigger/equal to free cores/memory Loop(requirement of selected jobs exceed free mem/core):

if (requirement of selected jobs exceed free cores)

choose a job which has biggest requirement of cores and can reduce the core requirement Dynamic Core Management (job)

else if (requirement of selected jobs exceed free memory):

choose a job which has biggest requirement of memory and can reduce the memory requirement Dynamic Memory Management(job)

Exit

Figure 10A:
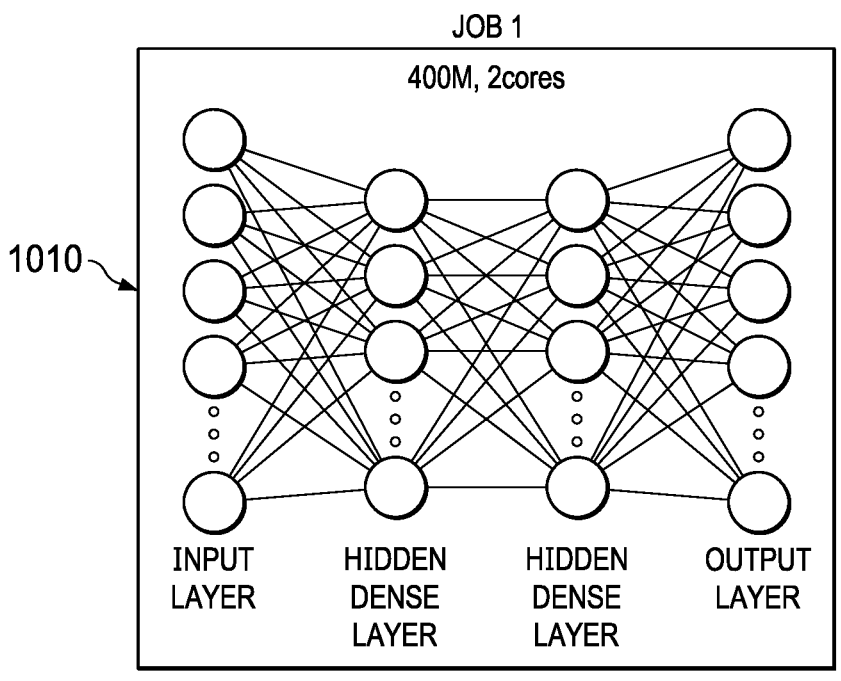
FIGS. 10A-10D are diagrams illustrating a GPU card (D) and three jobs (A-C) in accordance with an illustrative embodiment.
Figure 10B:
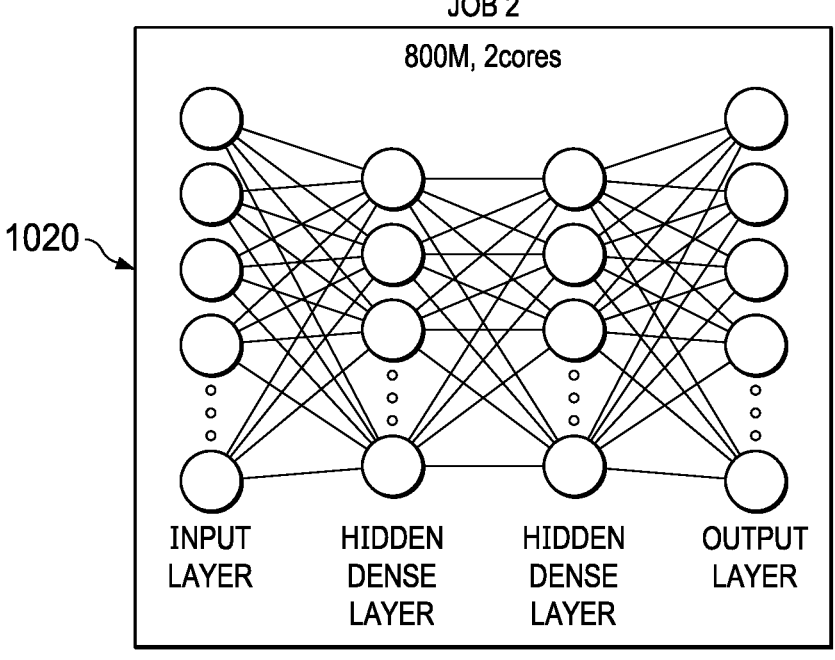
Figure 10C:
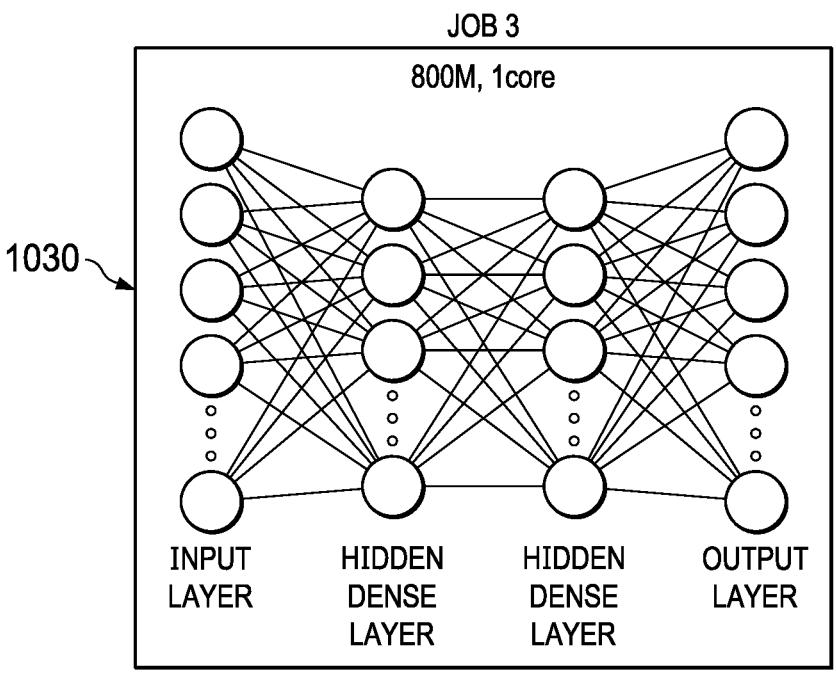
Figure 10D:
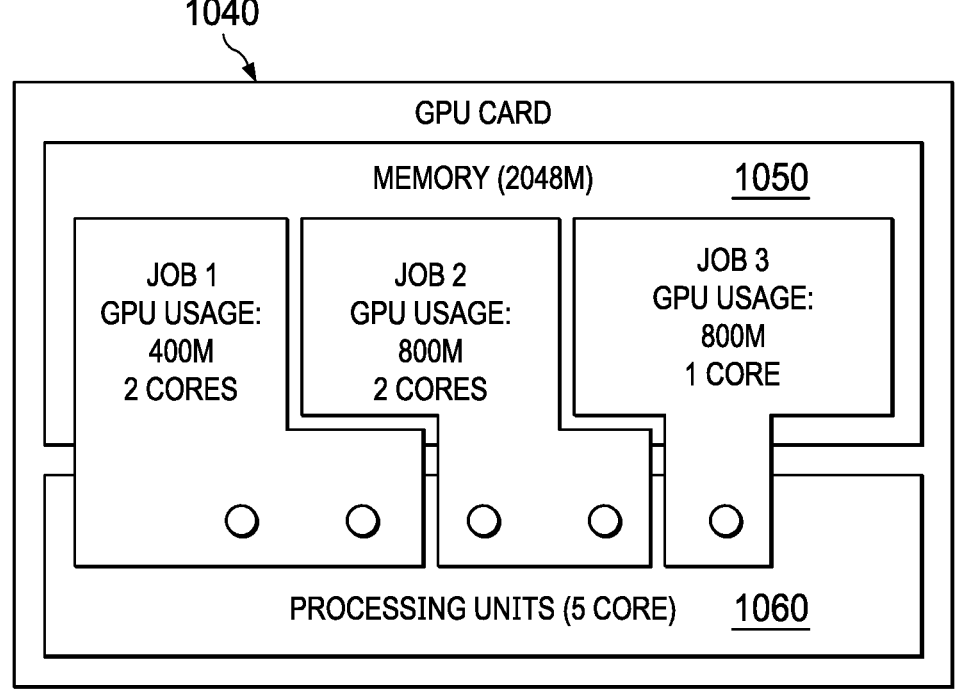

If the requirement of selected jobs still exceed free mem/core, drop some jobs randomly to ensure the free mem/core can satisfy the requirement Put the selected jobs into the GPU With reference now to FIGS. 10A-10D, diagrams illustrating a GPU card 1040 (D) and three jobs (A-C) are depicted in which illustrative embodiments may be implemented. FIG. 10A shows Job 1 1010 which requires 900M and 2 cores. FIG. 10B shows Job 2 1020 that requires 800M and 2 cores. FIG. 10C shows Job 3 1030 which requires 800M and 1 core. FIG. 10D shows GPU Card 1040 including memory 1050 and processing units 1060 including 5 cores.

In this illustrative example, static management will be described.

Get Job 1, Job 2, Job 3

Mem(j1)+Mem(j2)+Mem(j3)=2500M>=2048M

Core(j1)+Core(j2))+Core(j3)=5>=5

Packing job1 as memory requirement is exceeded, and its memory requirement is biggest "Dynamic Memory Management" on job1 to reduce its memory requirement to 400M, the total requirement is 2000M now, same as the free memory.

Put all jobs into the GPU card

Figure 11A:
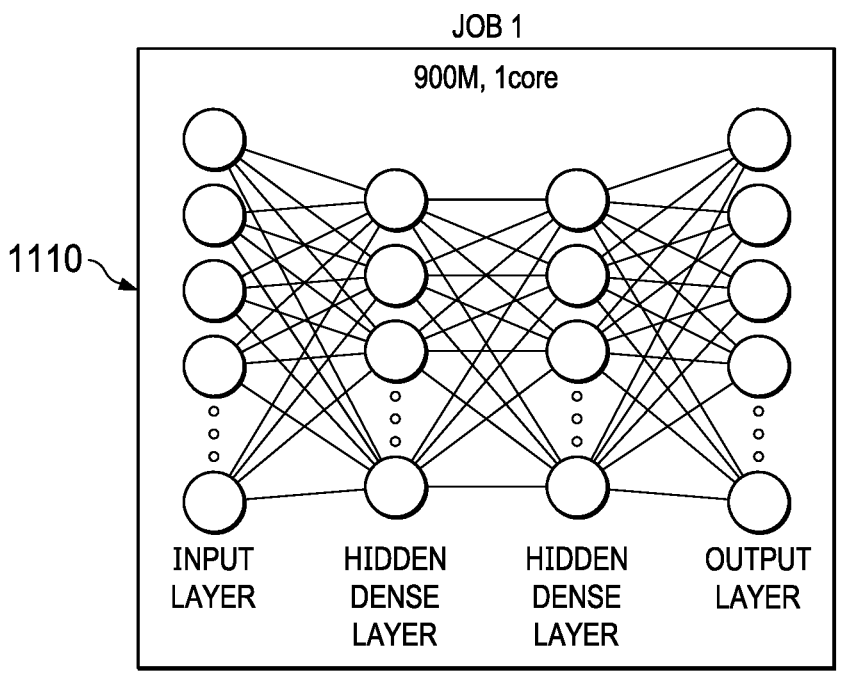
Figure 11B:
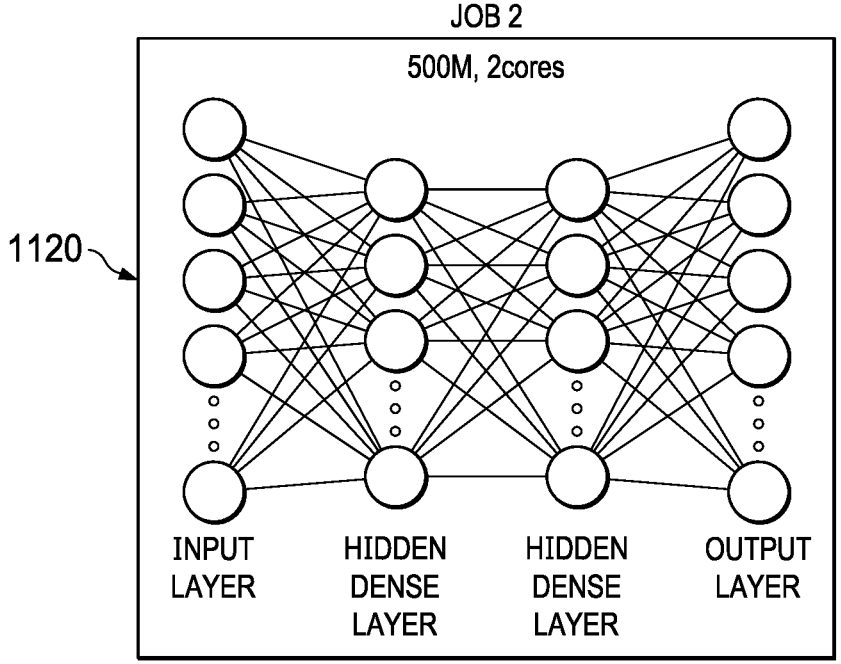
Figure 11C:
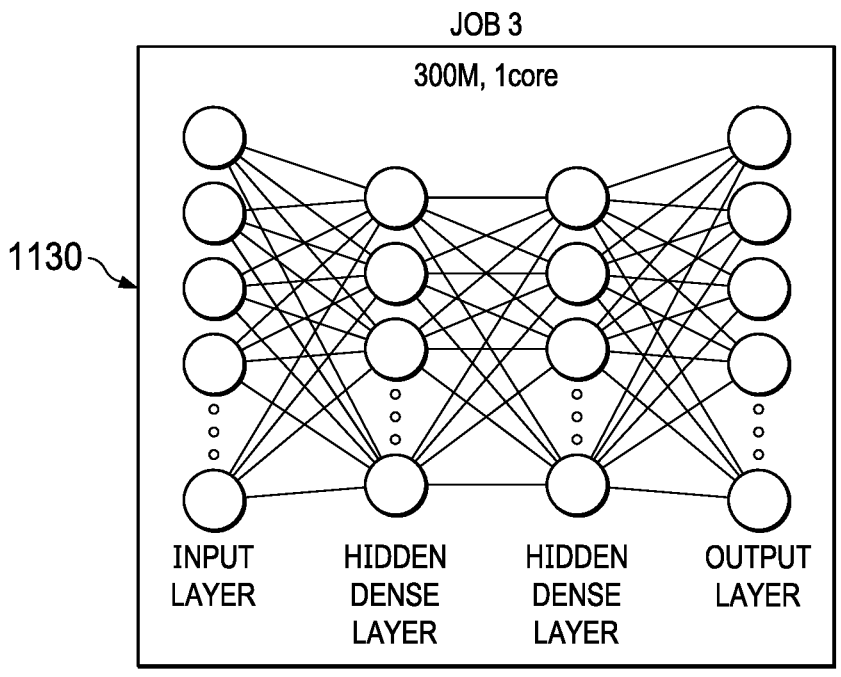
Figure 11D:
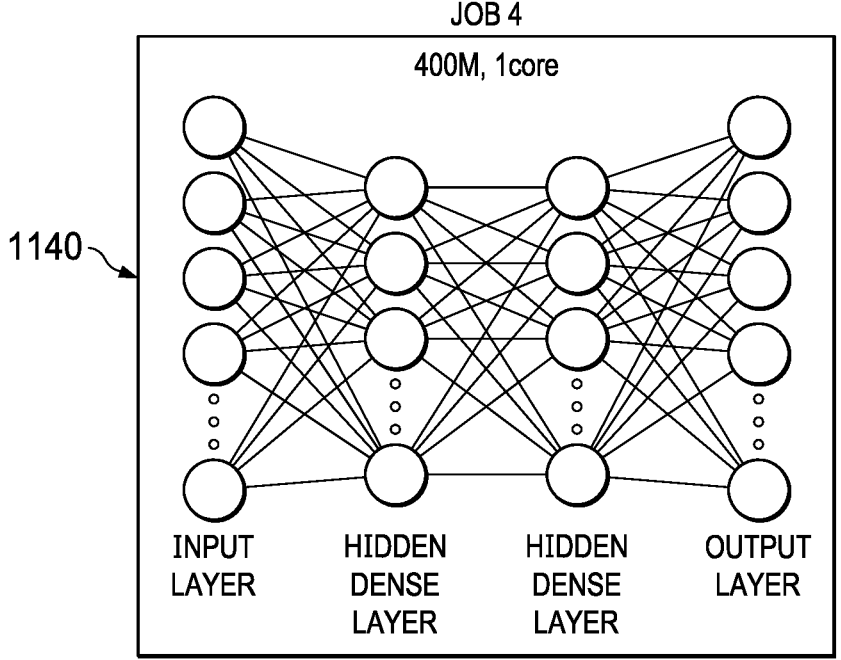
Figure 11E:
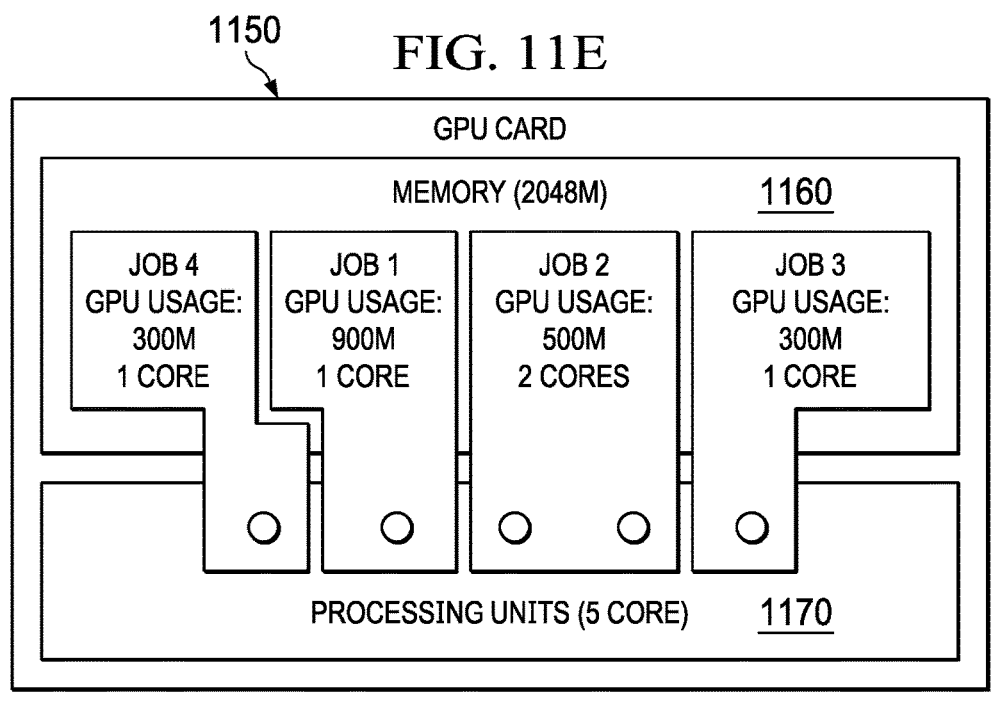

With reference now to FIGS. 11A-10E, diagrams illustrating a GPU card 1150 (E) and four jobs (A-D) are depicted in which illustrative embodiments may be implemented. FIG. 11A shows Job 1 1110 which requires 900M and 1 core. FIG. 11B shows Job 2 1120 that requires 500M and 2 cores. FIG. 11C shows Job 3 1130 which requires 300M and 1 core. FIG. 11D shows Job 4 1140 which requires 400M and 1 core. FIG. 11E shows GPU Card 1150 including memory 1160 and processing units 1070 including 5 cores.

In this illustrative example, dynamic management will be described.

Starting at time t0,

Initial: Job1, Job2

Mem(j1)+Mem(j2)=1400M<=2048M

Core(j1)+Core(j2)=3<=5

Packing job1,2 into the GPU card
   Free memory: 648M
   Free core: 2
at time t1,
Job 3 comes
   Mem(j3)=300M<=648M
   Core(j3)=1<=2
Packing job3 into the GPU card
   Free memory: 348M
   Free cores: 1
at time t2,
Job 4 comes
   Mem(j4)=400M>348M
   Core(j4)=1<=1
Dynamic Memory Manage for job 4
   Mem(j4)=300M<348M
   Dynamic memory: 100M
   Free core: 1
Put job4 into the GPU card
   Free memory: 48M
   Free core: 0

Figure 12:
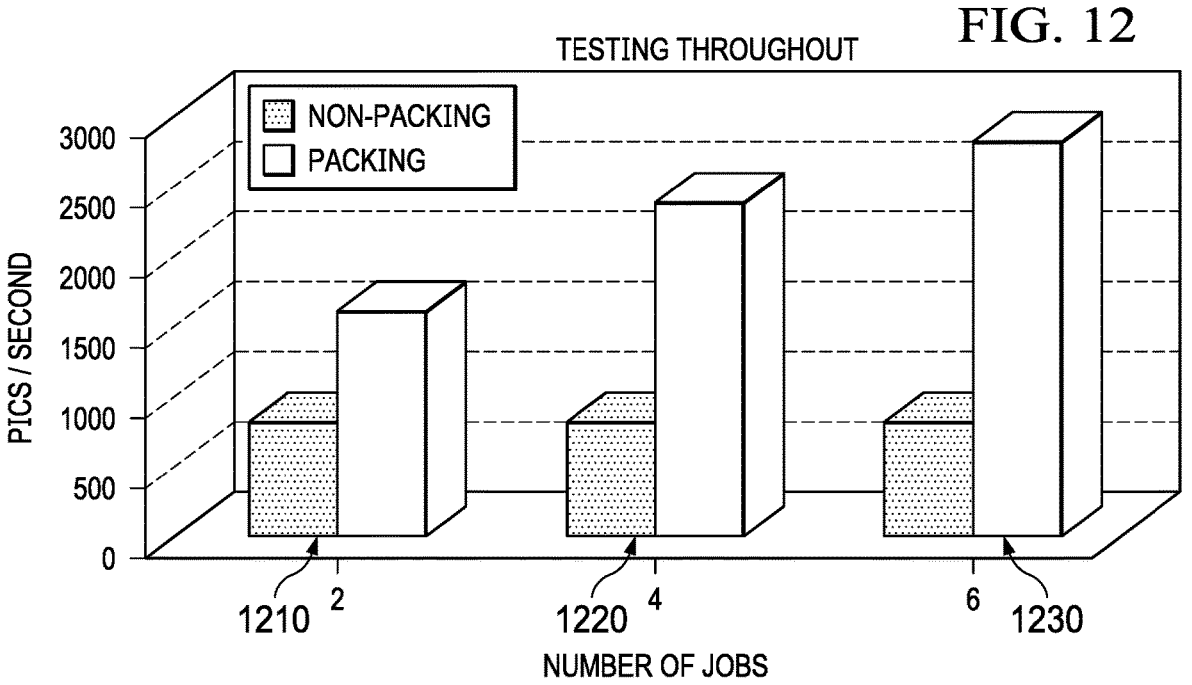
FIG. 12 is a diagram illustrating three comparative bar charts showing improved performance from packing in accordance with an illustrative embodiment.

With reference now to FIG. 12, a diagram illustrating three comparative bar charts showing improved performance from packing is depicted in which illustrative embodiments may be implemented. In this illustrative example, at 2 jobs 1210 the advantages of embodiments of this disclosure provide a factor of at least 2 increase in Pics/second. At 4 jobs 1220 the advantages of embodiments of this disclosure provide a factor of at least 3 increase in Pics/second. At 6 jobs 1230 the advantages of embodiments of this disclosure provide a factor of at least 4 increase in Pics/second.

With reference now to FIG. 13, a flowchart illustrating operations is depicted in which illustrative embodiments may be implemented for the practical application of controlling in a core dimension job packing a plurality of processing unit cores to reduce partial use of the plurality of processing unit cores by concurrently loading into the plurality of processing unit cores nodes of two or more jobs. This computer implemented method for sharing a processing unit improves core utilization and, therefore, operation of the processing unit.

In this illustrative example, operation 1310 includes receiving a first job comprising a first number of layers, at least one of the first number of layers comprising a first plurality of computational nodes, wherein the processing unit further comprising a plurality of unit cores. Operation 1320 includes receiving a second job comprising a second number of layers, at least one of the second number of layers comprising a second plurality of computational nodes, wherein the plurality of processing unit cores defines a number of processing unit cores. Operation 1330 includes sorting the first plurality of computational nodes into a first number of groups based on the number of processing unit cores to determine a timeline dimension minimum run time requirement upon the plurality of processing unit cores by the at least one of the first number of layers, the first number of groups comprising a first number of whole groups and a first number of partial groups. Operation 1340 includes sorting the second plurality of computational nodes into a second number of groups based on the number of processing unit cores to determine a timeline dimension minimum run time requirement upon the plurality of processing unit cores by the at least one of the second number of layers, the second number of groups comprising a second number of whole groups and a second number of partial groups. Operation includes 1350 controlling in a core dimension job packing the plurality of processing unit cores to reduce partial use of the plurality of processing unit cores by concurrently loading into the plurality of processing unit cores: all computational nodes of at least one member selected from the group consisting of the first number of whole groups and the first number of partial groups; and all computation nodes of at least one member selected from the group consisting of the second number of whole groups and the second number of partial groups.

With reference now to FIG. 14, a flowchart illustrating operations is depicted in which illustrative embodiments may be implemented via additional optional operations to control in a core dimension job packing the plurality of processing unit cores, thereby further improving performance of the processing unit. In this illustrative example, operation 1410 includes controlling in a timeline dimension serializing both the first number of groups and the second number of groups comprising: loading all computational nodes of each of the first number of whole groups into the plurality of processing unit cores; loading all computational nodes of each of the second number of whole groups into the plurality of processing unit cores; loading all computational nodes of each of the first number of partial groups into the plurality of processing unit cores; and loading all computational nodes of each of the second number of partial groups into the plurality of processing unit cores. Operation 1420 includes running both the first job and the second job on the plurality of processing unit cores. In preferred embodiments, operation 1410 is performed before operation 1420.

With reference now to FIG. 15, a flowchart illustrating operations is depicted in which illustrative embodiments may be implemented via additional optional operations to control in both a processing unit dimension and a timeline dimension job packing the plurality of processing unit cores, thereby further improving performance of the processing unit. In this illustrative example, operation 1510 includes controlling in both a processing unit dimension and a timeline dimension serializing both the first number of groups and the second number of groups comprising: loading into the plurality of processing unit cores at least one of: at least one of the first number of whole groups; at least one of the second number of whole groups; at least one of first number of partial groups; and at least one of the second number of partial groups; and loading into a second plurality of processing unit cores located in a second processing unit at least one of: at least one of the first number of whole groups; at least one of the second number of whole groups; at least one of first number of partial groups; and at least one of the second number of partial groups. Operation 1520 includes controlling in a memory dimension sharing a memory, the memory coupled to the processing unit. In preferred embodiments, operation 1510 can be performed before or after operation 1520.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent at least one of a module, a segment, a function, or a portion of an operation or step. For example, one or more of the blocks can be implemented as program instructions, hardware, or a combination of the program instructions and hardware. When implemented in hardware, the hardware may, for example, take the form of integrated circuits that are manufactured or configured to perform one or more operations in the flowcharts or block diagrams. When implemented as a combination of program instructions and hardware, the implementation may take the form of firmware. Each block in the flowcharts or the block diagrams can be implemented using special purpose hardware systems that perform the different operations or combinations of special purpose hardware and program instructions run by the special purpose hardware.

In some alternative implementations of an illustrative embodiment, the function or functions noted in the blocks may occur out of the order noted in the figures. For example, in some cases, two blocks shown in succession can be performed substantially concurrently, or the blocks may sometimes be performed in the reverse order, depending upon the functionality involved. Also, other blocks can be added in addition to the illustrated blocks in a flowchart or block diagram.

Figure 16:
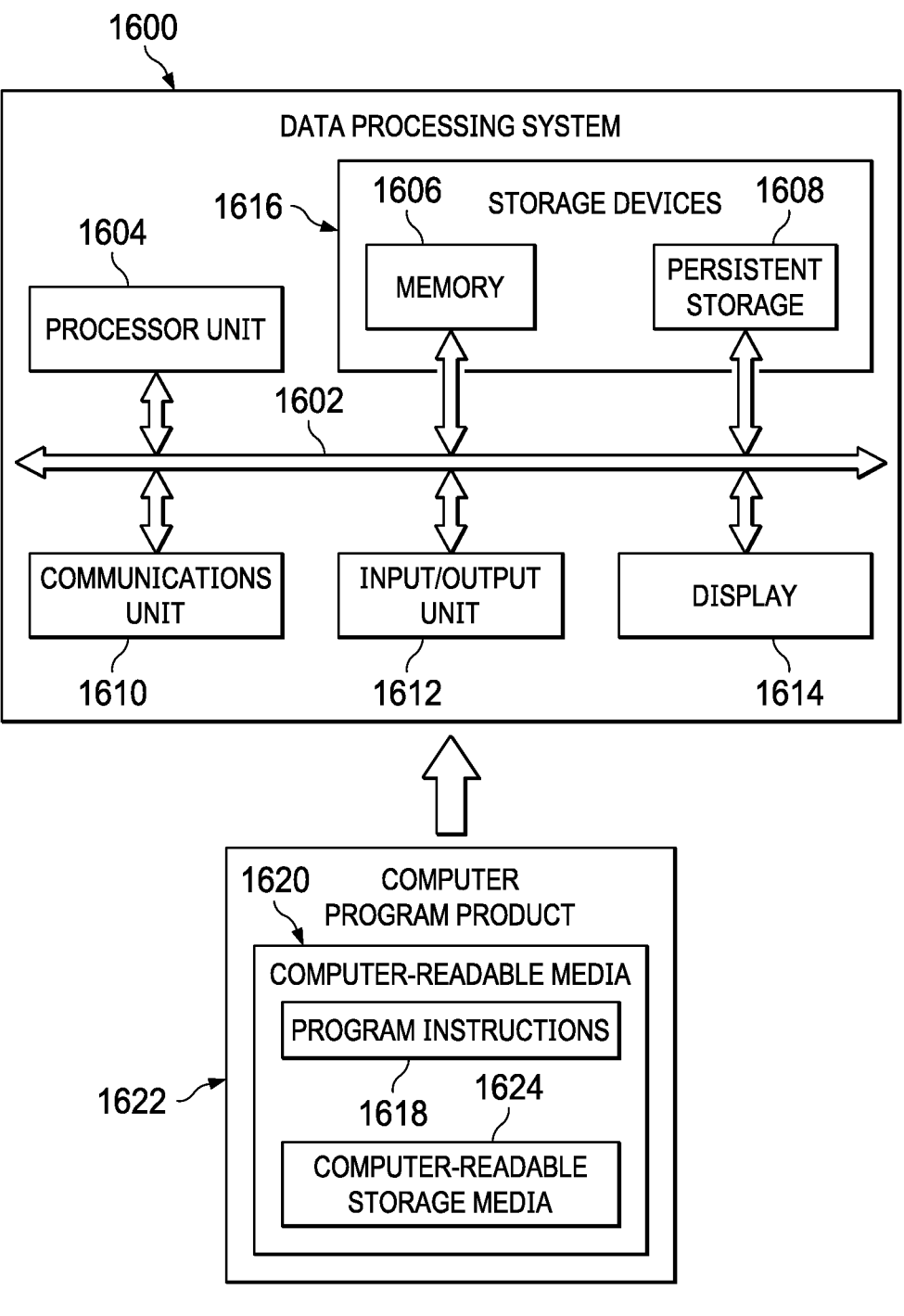
FIG. 16 is a block diagram of a data processing system in accordance with an illustrative embodiment.

Turning now to FIG. 16, a block diagram of a data processing system is depicted in accordance with an illustrative embodiment. Data processing system 1600 can be used to implement computer system 414 in FIG. 1. In this illustrative example, data processing system 1600 includes communications framework 1602, which provides communications between processor unit 1604, memory 1606, persistent storage 1608, communications unit 1610, input/output (I/O) unit 1612, and display 1614. In this example, communications framework 1602 takes the form of a bus system.

Processor unit 1604 serves to execute instructions for software that can be loaded into memory 1606. Processor unit 1604 includes one or more processors. For example, processor unit 1604 can be selected from at least one of a multicore processor, a central processing unit (CPU), a graphics processing unit (GPU), a physics processing unit (PPU), a digital signal processor (DSP), a network processor, or some other suitable type of processor. Further, processor unit 1604 can may be implemented using one or more heterogeneous processor systems in which a main processor is present with secondary processors on a single chip. As another illustrative example, processor unit 1604 can be a symmetric multi-processor system containing multiple processors of the same type on a single chip.

Memory 1606 and persistent storage 1608 are examples of storage devices 1616. A storage device is any piece of hardware that is capable of storing information, such as, for example, without limitation, at least one of data, program instructions in functional form, or other suitable information either on a temporary basis, a permanent basis, or both on a temporary basis and a permanent basis. Storage devices 1616 may also be referred to as computer-readable storage devices in these illustrative examples. Memory 1606, in these examples, can be, for example, a random-access memory or any other suitable volatile or non-volatile storage device. Persistent storage 1608 may take various forms, depending on the particular implementation.

For example, persistent storage 1608 may contain one or more components or devices. For example, persistent storage 1608 can be a hard drive, a solid-state drive (SSD), a flash memory, a rewritable optical disk, a rewritable magnetic tape, or some combination of the above. The media used by persistent storage 1608 also can be removable. For example, a removable hard drive can be used for persistent storage 1608.

Communications unit 1610, in these illustrative examples, provides for communications with other data processing systems or devices. In these illustrative examples, communications unit 1610 is a network interface card.

Input/output unit 1612 allows for input and output of data with other devices that can be connected to data processing system 1600. For example, input/output unit 1612 may provide a connection for user input through at least one of a keyboard, a mouse, or some other suitable input device. Further, input/output unit 1612 may send output to a printer. Display 1614 provides a mechanism to display information to a user.

Instructions for at least one of the operating system, applications, or programs can be located in storage devices 1616, which are in communication with processor unit 1604 through communications framework 1602. The processes of the different embodiments can be performed by processor unit 1604 using computer-implemented instructions, which may be located in a memory, such as memory 1606.

These instructions are referred to as program instructions, computer usable program instructions, or computer-readable program instructions that can be read and executed by a processor in processor unit 1604. The program instructions in the different embodiments can be embodied on different physical or computer-readable storage media, such as memory 1606 or persistent storage 1608.

Program instructions 1618 is located in a functional form on computer-readable media 1620 that is selectively removable and can be loaded onto or transferred to data processing system 1600 for execution by processor unit 1604. Program instructions 1618 and computer-readable media 1620 form computer program product 1622 in these illustrative examples. In the illustrative example, computer-readable media 1620 is computer-readable storage media 1624.

Computer-readable storage media 1624 is a physical or tangible storage device used to store program instructions 1618 rather than a medium that propagates or transmits program instructions 1618. Computer readable storage media 1624, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Alternatively, program instructions 1618 can be transferred to data processing system 1600 using a computer-readable signal media. The computer-readable signal media are signals and can be, for example, a propagated data signal containing program instructions 1618. For example, the computer-readable signal media can be at least one of an electromagnetic signal, an optical signal, or any other suitable type of signal. These signals can be transmitted over connections, such as wireless connections, optical fiber cable, coaxial cable, a wire, or any other suitable type of connection.

Further, as used herein, "computer-readable media 1620" can be singular or plural. For example, program instructions 1618 can be located in computer-readable media 1620 in the form of a single storage device or system. In another example, program instructions 1618 can be located in computer-readable media 1620 that is distributed in multiple data processing systems. In other words, some instructions in program instructions 1618 can be located in one data processing system while other instructions in program instructions 1618 can be located in another data processing system. For example, a portion of program instructions 1618 can be located in computer-readable media 1620 in a server computer while another portion of program instructions 1618 can be located in computer-readable media 1620 located in a set of client computers.

Thus, the illustrative embodiments provide a computer implemented method, a computer system, and a computer program product for the computer implemented method for managing jobs using job processing pools. The computer system receives a job having a job type. The computer system identifies a job processing pool in the job processing pools for running the jobs of the job type, wherein the job processing pool comprises job processors for running the jobs of the job type and wherein another job processing pool in the job processing pools comprises other job processors for running the jobs of a different job type. The computer system runs the job having the job type using a job processor of the job type in the job processing pool for the job type. According to other illustrative embodiments, a computer system and a computer program product for managing jobs are provided.

As a result, in the illustrative of examples, one or more technical solutions can provide a technical effect of increasing the performance in running jobs in a computer system in which at least one of overall throughput of job processing is increased, wait times for running jobs is reduced, or resources held by job processors is reduced at any given time. In the illustrative example, the overall throughput in running jobs can be increased within different time intervals. Further, the wait times across the different types of jobs also can be reduced. In other words, job processors can be made available for running jobs immediately or as soon as possible. Further, to the management of containers resources held across different containers can be reduced at any given time. Further, these efficiencies can take into account job priorities in running jobs.

The description of the different illustrative embodiments has been presented for purposes of illustration and description and is not intended to be exhaustive or limited to the embodiments in the form disclosed. The different illustrative examples describe components that perform actions or operations. In an illustrative embodiment, a component can be configured to perform the action or operation described. For example, the component can have a configuration or design for a structure that provides the component an ability to perform the action or operation that is described in the illustrative examples as being performed by the component. Further, To the extent that terms "includes", "including", "has", "contains", and variants thereof are used herein, such terms are intended to be inclusive in a manner similar to the term "comprises" as an open transition word without precluding any additional or other elements.

The descriptions of the various embodiments of the present invention have been presented for purposes of illustration, but are not intended to be exhaustive or limited to the embodiments disclosed. Not all embodiments will include all of the features described in the illustrative examples. Further, different illustrative embodiments may provide different features as compared to other illustrative embodiments. Many modifications and variations will be apparent to those of ordinary skill in the art without departing from the scope and spirit of the described embodiment. The terminology used herein was chosen to best explain the principles of the embodiment, the practical application or technical improvement over technologies found in the marketplace, or to enable others of ordinary skill in the art to understand the embodiments disclosed here.

What is claimed is:

1. A computer implemented method for sharing a processing unit, the computer implemented method comprising:

receiving, by a computer system comprising the processing unit, a first inference job comprising a first number of layers, at least one of the first number of layers comprising a first plurality of computational nodes, wherein the processing unit comprises a plurality of processing unit cores;

receiving, by the computer system comprising the processing unit, a second inference job comprising a second number of layers, at least one of the second number of layers comprising a second plurality of computational nodes, wherein the plurality of processing unit cores defines a number of processing unit cores;

sorting, by the computer system comprising the processing unit, the first plurality of computational nodes into a first number of groups based on the number of processing unit cores to determine a timeline dimension minimum run time requirement upon the plurality of processing unit cores by the at least one of the first number of layers;

sorting, by the computer system comprising the processing unit, the second plurality of computational nodes into a second number of groups based on the number of processing unit cores to determine a timeline dimension minimum run time requirement upon the plurality of processing unit cores by the at least one of the second number of layers; and controlling, by the computer system comprising the processing unit, in a core dimension, job packing the plurality of processing unit cores by concurrently loading into the plurality of processing unit cores:

all computational nodes of the first number of groups formed by sorting the first plurality of computational nodes by the computer system; and all computational nodes of the second number of groups formed by sorting the second plurality of computational nodes by the computer system, wherein job packing includes controlling in a timeline dimension serializing both the first number of groups and the second number of groups.

2. The computer implemented method of claim 1, wherein nodes in each group of the first number of groups are concurrently executed.

3. The computer implemented method of claim 1, wherein how many computational nodes exist for a given layer of the first number of layers determines how many of the processing unit cores to use for the given layer of the first number of layers.

4. The computer implemented method of claim 1, wherein the processing unit further comprises a graphical processing unit and each of the plurality of processing unit cores further comprises a graphical processing unit core.

5. The computer implemented method of claim 1, wherein controlling in a timeline dimension serializing both the first number of groups and the second number of groups comprises:

loading all computational nodes of each of the first number of groups into the plurality of processing unit cores; and loading all computational nodes of each of the second number of groups into the plurality of processing unit cores.

6. The computer implemented method of claim 5, further comprising running, by the computer system comprising the processing unit, both the first job and the second job on the plurality of processing unit cores.

7. The computer implemented method of claim 1, further comprising controlling, by the computer system comprising the processing unit, in both a processing unit dimension and a timeline dimension serializing both the first number of groups and the second number of groups comprising:

loading into the plurality of processing unit cores at least one of:

at least one of the first number of groups; and at least one of the second number of groups; and loading into a second plurality of processing unit cores located in a second processing unit at least one of:

at least one of the first number of groups; and at least one of the second number of groups.

8. A computer system comprising:

a processing unit, the processing unit comprising a plurality of processing unit cores, wherein the processing unit executes program instructions to:

receive, by the computer system comprising the processing unit, a first inference job comprising a first number of layers, at least one of the first number of layers comprising a first plurality of computational nodes;

receive, by the computer system comprising the processing unit, a second inference job comprising a second number of layers, at least one of the second number of layers comprising a second plurality of computational nodes, wherein the plurality of processing unit cores defines a number of processing unit cores;

sort, by the computer system comprising the processing unit, the first plurality of computational nodes into a first number of groups based on the number of processing unit cores to determine a timeline dimension minimum run time requirement upon the plurality of processing unit cores by the at least one of the first number of layers;

sort, by the computer system comprising the processing unit, the second plurality of computational nodes into a second number of groups based on the number of processing unit cores to determine a timeline dimension minimum run time requirement upon the plurality of processing unit cores by the at least one of the second number of layers; and control, by the computer system comprising the processing unit, in a core dimension, job packing the plurality of processing unit cores by concurrently loading into the plurality of processing unit cores:

all computational nodes of the first number of groups formed by sorting the first plurality of computational nodes by the computer system; and all computational nodes of the second number of groups formed by sorting the first plurality of computational nodes by the computer system, wherein job packing includes controlling in a timeline dimension serializing both the first number of groups and the second number of groups.

9. The computer system of claim 8, wherein nodes in each group of the first number of groups are concurrently executed.

10. The computer system of claim 8, wherein how many computational nodes exist for a given layer of the first number of layers determines how many of the processing unit cores to use for the given layer of the first number of layers.

11. The computer system of claim 8, wherein the processing unit further comprises a graphical processing unit and each of the plurality of processing unit cores further comprises a graphical processing unit core.

12. The computer system of claim 8, wherein controlling in a timeline dimension serializing both the first number of groups and the second number of groups comprises:

loading all computational nodes of each of the first number of groups into the plurality of processing unit cores; and loading all computational nodes of each of the second number of groups into the plurality of processing unit cores.

13. The computer system of claim 12, wherein the processing unit executes program instructions to:

run, by the computer system comprising the processing unit, both the first job and the second job on the plurality of processing unit cores.

14. The computer system of claim 8, wherein the processing unit executes program instructions to:

control, by the computer system comprising the processing unit, in both a processing unit dimension and a timeline dimension serializing both the first number of groups and the second number of groups comprising:

loading into the plurality of processing unit cores at least one of:

at least one of the first number of groups; and at least one of the second number of groups; and loading into a second plurality of processing unit cores located in a second processing unit at least one of:

at least one of the first number of groups; and at least one of the second number of groups.

15. A computer program product for processor unit sharing, the computer program product comprising a computer readable storage medium having program instructions embodied therewith, the program instructions executable by a computer system to cause the computer system to perform a method of:

receiving, by the computer system comprising a processing unit, a first inference job comprising a first number of layers, at least one of the first number of layers comprising a first plurality of computational nodes, wherein the processing unit comprises a plurality of processing unit cores;

receiving, by the computer system comprising the processing unit, a second inference job comprising a second number of layers, at least one of the second number of layers comprising a second plurality of computational nodes, wherein the plurality of processing unit cores defines a number of processing unit cores;

sorting, by the computer system comprising the processing unit, the first plurality of computational nodes into a first number of groups based on the number of processing unit cores to determine a timeline dimension minimum run time requirement upon the plurality of processing unit cores by the at least one of the first number of layers;

sorting, by the computer system comprising the processing unit, the second plurality of computational nodes into a second number of groups based on the number of processing unit cores to determine a timeline dimension minimum run time requirement upon the plurality of processing unit cores by the at least one of the second number of layers; and controlling, by the computer system comprising the processing unit, in a core dimension, job packing the plurality of processing unit cores by concurrently loading into the plurality of processing unit cores:

all computational nodes of the first number of groups formed by sorting the first plurality of computational nodes by the computer system; and all computational nodes of the second number of groups formed by sorting the first plurality of computational nodes by the computer system, wherein job packing includes controlling in a timeline dimension serializing both the first number of groups and the second number of groups.

16. The computer program product for processor unit sharing of claim 15, wherein nodes in each group of the first number of groups are concurrently executed.

17. The computer program product for processor unit sharing of claim 15, the method wherein how many computational nodes exist for a given layer of the first number of layers determines how many of the processing unit cores to use for the given layer of the first number of layers.

18. The computer program product for processor unit sharing of claim 15, the method wherein the processing unit further comprises a graphical processing unit and each of the plurality of processing unit cores further comprises a graphical processing unit core.

19. The computer program product for processor unit sharing of claim 15, the method wherein controlling in a timeline dimension serializing both the first number of groups and the second number of groups comprises:

loading all computational nodes of each of the first number of groups into the plurality of processing unit cores; and loading all computational nodes of each of the second number of groups into the plurality of processing unit cores.

20. The computer program product for processor unit sharing of claim 15, the method further comprising controlling, by the computer system comprising the processing unit, in both a processing unit dimension and a timeline dimension serializing both the first number of groups and the second number of groups comprising:

loading into the plurality of processing unit cores at least one of:
at least one of the first number of groups; and
at least one of the second number of groups; and loading into a second plurality of processing unit cores located in a second processing unit at least one of:
at least one of the first number of groups; and
at least one of the second number of groups.

* * * * *